United States Patent
Miki et al.

(10) Patent No.: US 7,346,194 B2
(45) Date of Patent: *Mar. 18, 2008

(54) METHOD AND APPARATUS OF MEASURING ROTATIONAL AND FLIGHT CHARACTERISTICS OF SPHERE

(75) Inventors: Mitsunori Miki, Kyoto (JP); Masahiko Ueda, Hyogo (JP); Masahide Onuki, Hyogo (JP)

(73) Assignees: Mitsunori Miki, Kyoto (JP); SRI Sports Limited, Kobe-Shi (JP)

( * ) Notice: Subject to any disclaimer, the term of this patent is extended or adjusted under 35 U.S.C. 154(b) by 674 days.

This patent is subject to a terminal disclaimer.

(21) Appl. No.: 10/681,156

(22) Filed: Oct. 9, 2003

(65) Prior Publication Data

US 2004/0076311 A1    Apr. 22, 2004

(30) Foreign Application Priority Data

Oct. 10, 2002    (JP) ............................. 2002-297580

(51) Int. Cl.
*G06K 9/00*    (2006.01)
*G06K 9/36*    (2006.01)

(52) U.S. Cl. ...................... 382/107; 382/289
(58) Field of Classification Search ................ 382/103, 382/106, 107, 151, 294, 293, 288, 289, 291; 355/47, 53, 43, 49; 359/8, 28
See application file for complete search history.

(56) References Cited

U.S. PATENT DOCUMENTS 5,471,383 A    11/1995    Gobush et al.
5,479,008 A    12/1995    Nishiyama et al.
6,042,483 A    3/2000    Katayama
6,097,472 A *   8/2000    Tanaka et al. ................. 355/47
6,226,416 B1*   5/2001    Ohshima et al. ............ 382/289
7,062,082 B2*   6/2006    Miki et al. .................. 382/154

\* cited by examiner

*Primary Examiner*—Samir Ahmed
*Assistant Examiner*—Jayesh A Patel
(74) *Attorney, Agent, or Firm*—Birch, Stewart, Kolasch & Birch, LLP

(57) ABSTRACT

A reference posture and a reference position of the imaginary sphere and an arbitrary position are set. The relationship between three-dimensional coordinates and two-dimensional coordinates is derived by using a photographing means. Positions of marks given to the imaginary sphere formed at the coordinates in the three-dimensional space are converted into positions on a two-dimensional image. An operation of displacing a posture of the imaginary sphere relative to the reference posture and the reference position is performed in such a way that the coordinate values of the two-dimensional imaginary marks and the coordinate values of the marks present on the two-dimensional images of the sphere are coincident with each other. The rotational and flight characteristics of the sphere are computed, according to the three-dimensional posture and position at one time and the three-dimensional posture and position thereof at another time.

7 Claims, 14 Drawing Sheets

Prior Art

METHOD AND APPARATUS OF MEASURING ROTATIONAL AND FLIGHT CHARACTERISTICS OF SPHERE

This nonprovisional application claims priority under 35 U.S.C. §119(a) on Patent Application No. 2002-297580 filed in JAPAN on Oct. 10, 2002, which is herein incorporated by reference.

BACKGROUND OF THE INVENTION

1. Field of the Invention

The present invention relates to a method of measuring rotational and flight characteristics of a sphere and an apparatus for measuring the rotational and flight characteristics of the sphere. More particularly, the present invention relates to the method of measuring the number of rotations of the sphere such as a golf ball, the direction of the rotational axis thereof, the flight path thereof, and the flight speed thereof by specifying the three-dimensional posture and position thereof.

2. Description of the Related Art

Various methods and apparatuses for measuring the rotational amount and the like of spheres such as the golf ball are proposed.

According to a known method, light is emitted to a sphere having a reflection tape bonded to its surface or to a sphere having a non-reflecting region painted in black on its surface to thereby measure the rotational amount of the sphere, based on a change in the amount of reflection light obtained by the rotation of the sphere. However the optical amount is measured in this method, whereas the contour of the sphere and the displacement of its posture are not measured. Thus it is impossible to specify the direction of the rotational axis and the like of the sphere. Therefore normally, a sphere having a plurality of marks given to its surface is photographed at predetermined intervals while the sphere is rotating and flying to find the rotational amount of the sphere and the direction of its rotational axis, based on a displacement situation of each of a plurality of images obtained by photographing the sphere.

As apparatuses and methods of finding the rotational amount and the like of the sphere from images of the photographed mark-given sphere, the following measuring apparatuses and methods are proposed: The apparatus for measuring the rotational amount of the sphere disclosed in Registered Patent No. 2810320, the method of measuring the motion of a golf ball disclosed in Japanese Patent Application Laid-Open No. 10-186474, and the apparatus for measuring the flight characteristic of sporting goods disclosed in Registered Patent No. 2950450.

In the measuring apparatus proposed by the present applicant and disclosed in Registered Patent No. 2810320, as shown in FIGS. 12A and 12B, the sphere T, having the center C, to which the marks P and Q are given is photographed twice to obtain two two-dimensional images G1 and G2. The radius of the sphere in each of the two-dimensional images G1 and G2 is specified as the unit radius. The three-dimensional coordinates of each of the marks P and Q and the center C are computed from the two-dimensional coordinates on the two-dimensional image G1. The three-dimensional coordinates of each of the marks P' and Q' and the center C' are also computed from the two-dimensional coordinates on the two-dimensional image G2. These computed three-dimensional coordinates are set as three-dimensional vectors to find the vector movement amount between the two images G1 and G2 to thereby compute the rotational amount of the sphere T and the direction of its rotational axis.

As shown in FIGS. 13A and 13B, in the measuring method disclosed in Japanese Patent Application Laid-Open No. 10-186474, the sensor 2 that detects the motion of a golf club when it hits the ball B1 is used to determine a photographing timing. The ball B1 is photographed at a predetermined interval by the first and second cameras 1A and 1B. Thereby as shown in FIG. 13B, the picture G3 in which the two balls B1 and B1' are present is obtained. The two-dimensional ball image G3 is processed by the method similar to that of the measuring apparatus disclosed in Registered Patent No. 2810320 to compute the rotational amount of the ball and the direction of its rotational axis.

With reference to FIGS. 14A and 14B, in the measuring apparatus 4 disclosed in Registered Patent No. 2950450, the balls B2 and B2' to which the marks Ba have been given are photographed by the synchronized cameras 5A and 5B to provide one picture in which the image of each of the balls B2 and B2' is present. The three-dimensional coordinates of the marks Ba are obtained based on a principle similar to the triangulation by relating the principle to the relationship between the visual field of the camera 5A and that of the camera 5B. Thereby as shown in FIG. 14B, a view of the three-dimensional region of the balls B2 and B2' is obtained to measure the characteristics of the ball. The method of obtaining the three-dimensional coordinates in this manner is known as DLT (Direct Liner Transformation).

Disclosed in Registered Patent No. 3185850 is the monitoring apparatus for measuring and displaying the flight characteristic of sporting goods. More specifically, using th shutter means, one image of a ball is obtained with at least one camera. The cameras are required to be calibrated by using more than a required number of points, having known coordinates, which are set in a space to be measured. By utilizing the relationship between known coordinates of a three-dimensional space and two-dimensional coordinates projected on the film surface of the camera, six variables (three components of coordinates of center of gravity of mass of sphere and three rotational amounts on reference coordinates) can be solved by repeatedly computing the linearity of Taylor's theorem eight times. It is possible to obtain three-dimensional coordinates of marks fixed to the ball by setting the length of an actual space as the reference not the radius of the ball image. Therefore it is unnecessary to correctly photograph the contour of the ball. Further it is possible to alleviate the problem of shortage of brightness that is caused by a high-speed shutter means for obtaining a still image of the ball flying at a high speed. The monitoring apparatus improves the degree of freedom of photographing equipment.

As disclosed in Registered Patent No. 2626964, the present applicant proposed a method of measuring the position and the driving angle of a spherical object. The method is carried out by a projection apparatus that projects a plurality of parallel beams of light and by a plurality of light-receiving apparatuses that detect incidence and shielding of light projected by the projection apparatus. The period of time in which the light beams are shielded is measured by using the distance between a ball and a plane where the projection apparatus and the light-receiving apparatuses are disposed, the position of light beams shielded after the ball was impacted, dimensions between light beams, and the diameter of the ball. Thereby it is possible to determine the height position of the center of the ball and the deviation position thereof. Thereby the driving angle and deviation angle of the ball can be measured.

In the measuring apparatus shown in FIGS. 12A and 12B and the measuring method shown in FIGS. 13A and 13B, because the radius of the sphere image is used in computations for measurement, the accuracy of the three-dimensional vector to be computed depends on the accuracy of the radius of the sphere image. Thus it is necessary to highly accurately photograph the sphere to obtain its image on the basis of which the measurement is made. It is also necessary to find the radius of the sphere with high accuracy from the photographed images. To obtain a still image of the sphere flying at a high speed, it is necessary to use a high-speed camera having a high-speed shutter. However because the high-speed shutter opens in a very short period of time, it is difficult to obtain a sufficient amount of light.

The sphere image is comparatively clear in the vicinity of the center thereof because the center of the ball confronts the camera. On the other hand, it is difficult to clearly capture the contour of the sphere. Even though the manner of emitting light to the sphere is adjusted, it is difficult to solve this problem. Consequently the contour of the image of the sphere is unclear. Thus the radius of the image is read with low accuracy, which causes the rotational amount of the sphere and the like to be measured with low accuracy.

In the measuring apparatus shown in FIGS. 14A and 14B, the three-dimensional coordinates of the marks given to the surface of the ball are obtained not by using the radius of the ball image but on the basis of the length of an actual space. Thus it is unnecessary to photograph the contour of the ball clearly, and the problem of shortage of luminous intensity rarely occurs. Further the measuring apparatus shown in FIGS. 14A and 14B has an advantage of reducing a burden on the measuring equipment. However, to find the three-dimensional coordinates of the marks given to the surface of the ball with high accuracy, it is necessary to obtain images of the ball in a comparatively large size to allow the marks to be read accurately. To photograph the ball in a large size, it is necessary to obtain the two images of the ball by photographing it at a short interval, which reduces the rotational amount of one ball image with respect to that of the other ball image.

To measure the rotational amount of the ball with high accuracy, it is necessary to increase the moving distance of each mark to thereby increase the displacement of the position of the mark, i.e., increase the rotational amount of one ball image with respect to that of the other ball image, which necessitates a condition reciprocal to the increasing of the ball image.

Thus it is possible to measure the three-dimensional coordinates of the marks with high accuracy by increasing the ball image. However, because the change of the positions between both images is small, the rotational amount of the ball cannot be measured with high accuracy. In the case where the ball is photographed in such a way as to increase the rotational amount of the other ball image with respect to that of the one ball image, it is necessary to photograph the ball at a long interval. In this case, although the rotational amount of the ball can be measured with high accuracy, the ball images are small. Therefore the three-dimensional coordinates of the marks are measured with low accuracy. Thus the measuring apparatus is incapable of measuring both the three-dimensional coordinates of the marks and the rotational amount of the ball with high accuracy.

To solve the above-described problem, it is conceivable to prepare two sets of measuring apparatuses to obtain one image of the ball with a first measuring apparatus and the other image thereof with a second measuring apparatus to measure both the three-dimensional coordinates of each mark and the rotational amount of the ball with high accuracy. However in carrying out measurement, it is necessary to make a calibration by associating the operation of four cameras of both sets of the measuring apparatuses with each other. Furthermore the measuring apparatus is required to have a very complicated construction and is hence very expensive. As such, it is difficult to use two sets of the measuring apparatuses.

Further in computing the rotational amount of the ball from the movement amount of the mark given to the surface of the photographed ball, it is necessary to recognize which of marks present on another image of the ball is coincident with a particular mark present on one image thereof. In the case where the direction of the rotational axis of the ball can be estimated, and the change of the rotational amount of another ball image with respect to that of the one ball image is small, it is comparatively easy to recognition of the particular mark. However in the case where the direction of the rotational axis of the ball cannot be estimated because the direction of the rotational axis of the ball changes greatly in each measurement or in the case where the change of the rotational amount of another ball image with respect to that of the one ball image is large, it is very difficult to accomplish the recognition of the particular mark. In this case, there is a possibility that the rotational amount of the ball and the like cannot be measured by means of an automatic recognition program of a computer. In the case where a man recognizes the particular mark, it takes much time and may make an erroneous recognition of the particular mark.

In addition, it is impossible to make measurement in the case where the mark which has appeared on the one ball image rotates to the reverse side of another ball image and does not appear on the surface thereof. In this case, there is a limitation in the measuring direction of the camera and the rotational direction of the ball. Thus the measuring apparatus has a problem of having difficulty in making measurement in an optimum situation.

In the monitoring apparatus disclosed in Registered Patent No. 3185850, the mark that is seen on one ball image is not present on another ball image in dependence on a rotation angle of the ball. That is, in the case where the mark which is present on the one ball image rotates to the reverse side of another ball image, it is impossible to measure the flight characteristic of the ball. Thus there is a limitation in the photographing direction of the camera and the rotational direction of the ball. Further the monitoring apparatus is inferior in portability.

In Registered Patent No. 2626964, it is possible to measure a passage position of the spherical object widely and accurately without contact when it is flying. However, there is a room for improvement in the method of computing the spin amount of the spherical object.

SUMMARY OF THE INVENTION

The present invention has been made in view of the above-described problems. Thus it is an object of the present invention to accurately measure rotational characteristics of a sphere such as the number of rotations thereof and the direction of the rotational axis thereof and the flight characteristic such as the flight path and flight speed thereof.

To achieve the object, there is provided a method of measuring rotational and flight characteristics of a sphere, comprising the steps of photographing the sphere, at predetermined intervals, having a plurality of marks given to a surface thereof while the sphere is rotating to obtain a plurality of two-dimensional images of the sphere; generating an imaginary sphere, having a plurality of marks given to a surface thereof, formed at coordinates of a three-dimensional space of a computer screen; and setting an arbitrary posture of the imaginary sphere and an arbitrary position thereof as a reference posture and a reference position respectively; deriving a relationship between three-dimensional coordinates and two-dimensional coordinates by using at least one photographing means; converting positions of the marks given to the surface of the imaginary sphere formed at the coordinates in the three-dimensional space into positions on a two-dimensional image by using the relationship to find coordinate values of two-dimensional imaginary marks and find coordinate values of the marks present on the two-dimensional images of the sphere; performing an operation of displacing a posture of the imaginary sphere relative to the reference posture and the reference position in such a way that the coordinate values of the two-dimensional imaginary marks and the coordinate values of the marks present on the two-dimensional images of the sphere are coincident with each other to specify a three-dimensional posture of the sphere and a three-dimensional position thereof for each of the two-dimensional images of the sphere, according to an amount of the posture displacement operation; and computing the rotational and flight characteristics of the sphere, according to the three-dimensional posture and position of the sphere specified for each of the two-dimensional images of the sphere at one time and the three-dimensional posture and position thereof at another time.

As described above, according to the present invention, the three-dimensional posture and position of the sphere are specified by the above-described method. Therefore based on the relationship between the three-dimensional posture and position of the sphere at one time and the three-dimensional posture and position thereof at another time, it is possible to measure the rotational characteristic of the sphere such as the number of rotations thereof and the direction of its rotational axis and the flight characteristic thereof such as the flight path thereof and its flight speed with ease and high accuracy. Therefore the measuring method of the present invention is optimum for measuring the spin amount of the golf ball rotating without being subjected to an external force, the driving angle and deviation angle of a hit ball. Particularly, the measuring method of the present invention improves in accuracy in measuring the deviation angle in a right-to-left direction at the time of hitting the golf ball.

More specifically, according to measuring method of the present invention, the relationship between the three-dimensional coordinates and the two-dimensional coordinates is derived and grasped by using at least one photographing means. Therefore it is possible to find the positional relationship among the marks on the two-dimensional image from the positional relationship among the marks on the imaginary sphere formed on a computer screen. Thereby by using the above-described relationship, positions of the marks given to the surface of the imaginary sphere formed at the coordinates in the three-dimensional space are converted into positions on the two-dimensional image different from any of the two-dimensional images of the sphere to find the coordinate values of two-dimensional imaginary marks. Thereby the correspondence between the two-dimensional imaginary mark and the three-dimensional imaginary mark can be accomplished unlike the conventional art. Thus even the two-dimensional imaginary sphere is allowed to have three-dimensional information. That is, the information of the depth direction can be grasped. In the conventional measuring method, the information of the depth direction is not taken into consideration, but merely projection is made and two-dimensional images are all on a plane. Further projection is made in only one direction in the conventional method, whereas the projection direction is different in dependence on the position of the imaginary sphere in the present invention.

Therefore according to the measuring method, it is possible to measure the rotational and flight characteristics of the sphere with high accuracy, even when the edge of the sphere is not clearly seen, the sphere is photographed at an end of a screen or in a small size.

The posture and position of the imaginary sphere and those of the actual sphere are related to each other by means of the coordinate values of the imaginary marks and the coordinate values of the marks present on the two-dimensional image of the sphere. Thereby it is possible to express the posture and position of the actual sphere in terms of coordinate values relative to the reference posture and the reference position in the imaginary three-dimensional space. Consequently it is possible to use the coordinate values relative to the reference posture and the reference position in the imaginary space in analyzing the rotational and flight characteristics of the sphere. Thereby the rotational and flight characteristics of the sphere can be automatically and easily analyzed by automatic computations. The reference position means the origin of the three-dimensional coordinate system defined when the relationship between the three-dimensional space and the two-dimensional image is found.

According to the present invention, without using contour data of the sphere, the posture and position of the sphere are specified on the basis of a plurality of marks present on the surface of each of the two-dimensional images of the sphere obtained by photographing it. Thus it is possible to measure the posture and position of the sphere with high accuracy so long as the marks present on each of the two-dimensional images thereof can be clearly recognized, even though the contour of the sphere is unclear. To allow the computer to automatically recognize the marks given to the sphere, based on the two-dimensional images thereof obtained by photographing the sphere, it is conceivable to execute binarization of displaying the two-dimensional images in only white and black.

According to the measuring method of the present invention, the rotational characteristic of the sphere is found by computing a rotation matrix regarding an operation of rotating the imaginary sphere in making the three-dimensional posture and position thereof at one time coincident with the three-dimensional posture and position thereof at another time. The rotational characteristic of the sphere such as its rotational amount is obtained by the product of a rotation matrix which the sphere has at one time and a reciprocal of a rotation matrix which the sphere has at another time that can be specified in relation to the one time. It is easy to determine the rotational amount of the sphere and also find the vector of its rotational axis, namely, the direction of its rotational axis by determining the numerical value of the rotation matrix regarding the posture of the sphere at another time, based on the computed posture thereof at the one time.

The flight characteristic of the sphere is found by computing the movement amount and movement direction of the coordinates of the center of gravity of the sphere in making the three-dimensional posture and position of the sphere at one time coincident with the three-dimensional posture and position thereof at another time.

It is preferable to use at least six three-dimensional coordinates in deriving the relationship between the three-dimensional coordinates and the two-dimensional coordinates.

Thereby it is possible to find the relationship between the three-dimensional space and the two-dimensional space. That is, it is possible to clarify the relationship between the actual space and the image of the sphere obtained with a camera. If less than six three-dimensional coordinates are used, the number of known numerical values is less than the number of variables. Thus it is impossible to solve simultaneous equations indicating the relationship between the three-dimensional space and the two-dimensional space.

As a method of finding coordinate values of the two-dimensional imaginary mark by converting the positions of the marks on the imaginary sphere formed at coordinates of the three-dimensional space into positions on the two-dimensional image, the imaginary sphere is formed on the computer screen. Marks of the imaginary sphere in the reference posture and at the reference position are projected on the two-dimensional images by utilizing the relationship between the known three-dimensional coordinates in the actual space and the coordinates on the two-dimensional image.

As the design variables to be used in the posture displacement operation, it is preferable to use the following six variables: the three-dimensional positions of the center of gravity of the imaginary sphere and the rotation angles thereof on rectangular coordinates, namely, the abscissa axis, the ordinate axis, and the vertical axis in the imaginary three-dimensional space.

Thereby it is possible to compute depth information of the sphere. Thus it is possible to compute both the rotational and flight characteristics of the sphere.

The posture displacement operation means an operation of moving and rotating the imaginary sphere. It is preferable to find the amount of the posture displacement operation relative to the reference posture and the reference position by computations based on an optimization method called genetic algorithm.

The reference posture and reference position of the imaginary sphere are set arbitrarily on the computer screen. Thus the reference posture and reference position of the imaginary sphere are different from the two-dimensional image of the sphere in the size, position, and posture thereof. To allow the posture and position of the sphere to be displayed by coordinate values relative to the reference posture and the reference position of the imaginary sphere formed in the three-dimensional space, it is necessary to perform the operation of displacing the posture of the imaginary sphere in such a way that the posture and position of the imaginary sphere are coincident with those of the two-dimensional image of the sphere. To do so, a relational expression indicating the relationship between two-dimensional coordinates and three-dimensional coordinates is established.

The posture of the imaginary sphere is displaced by a parallel movement or the like and a rotation thereof on the computer screen. It is possible to make the posture and position of the imaginary sphere coincident with those of the actual sphere correctly by appropriately determining the amount of the posture displacement operation such as the parallel movement of the imaginary sphere. Consequently the posture and position of the sphere can be specified with high accuracy by means of the coordinate values relative to the reference posture and reference position of the imaginary sphere in the three-dimensional space. It is preferable that the determination of the amount of the posture displacement operation is grasped as the problem of optimization and that computations are performed by using the genetic algorithm, for a computer, which is one of methods for solving the problem of optimization.

The solving method to be carried out by using the genetic algorithm has characteristics different from other optimization methods such as a simulated annealing method, an inclination method, and linear programming. For example, the solving method by using the genetic algorithm has characteristics that a variable to be computed is coded to a binary number, a character string or a vector and that a goodness-of-fit for evaluating a computed result is set on the basis of an objective function.

The genetic algorithm is a probabilistic solving method of simultaneously searching an optimum solution from a large number of individuals by computations and is capable of optimizing a solution obtained by computations. Therefore with reference to a plurality of marks given to the surface of the imaginary sphere, the genetic algorithm is useful for making the posture and position of the imaginary sphere on the computer screen coincident with those of the two-dimensional image of the sphere.

In the computation based on the genetic algorithm, the amount of the operation of moving the imaginary sphere is set as three independent variables relating to the operation of moving the imaginary sphere three-dimensionally. Further the amount of the operation of rotating the imaginary sphere is set as three independent variables relating to the operation of rotating it three-dimensionally. The moving and rotating operations are performed on the basis of a numerical value of each of the six variables. The six variables thus set correspond to the coordinate values relative to the reference posture and the reference position of the imaginary sphere in the three-dimensional space, because the relational expression indicating the relationship between two-dimensional coordinates and three-dimensional coordinates is established. Therefore the posture and position of the sphere can be specified by finding the numerical value of each of the six variables.

The position of the center (x, y, z) of gravity of the imaginary sphere is used as the three variables relating to the operation of moving the imaginary sphere. The rotation angle of the imaginary sphere around each of the rectangular coordinates, namely, the abscissa axis, the ordinate axis, and the vertical axis in the imaginary three-dimensional space are used as the three independent variables relating to the operation of rotating the imaginary sphere three-dimensionally.

It is preferable that a plurality of the marks is given to the surface of the imaginary sphere, with the marks symmetrical at not more than four times with respect to the rotational axis thereof in the operation of rotating the imaginary sphere.

That is, a plurality of marks is given to positions on the surface of the imaginary sphere in such a way that when the imaginary sphere is rotated on the axis passing through the center thereof at an angle obtained by dividing 360 degrees by a natural number of four or less, all marks at the time before the rotation thereof are coincident with those at the time after the rotation thereof, supposing that the imaginary sphere is viewed in a certain direction. This is particularly useful for measuring the rotational speed of balls for ball games such as a golf ball, a tennis ball, and the like.

In the case where a plurality of marks is given to the surface of the imaginary sphere in this manner, none of viewable marks are coincident with each other before and after the rotation thereof, when the imaginary sphere is rotated at an angle less than 90 degrees. Thus the number of the postures which the imaginary sphere can take is limited to a small number. According to the present invention, a phenomenon all marks are coincident with each other before and after the rotation of the imaginary sphere at a certain angle when it is viewed in a certain direction is called (rotation) symmetry.

The imaginary sphere is rotated at 360 degrees, 180 degrees, 120 degrees or 90 degrees. For example, symmetry at the rotation of 360 degrees means the case in which a plurality of marks is given at random to the entire surface of the imaginary sphere. In this case, symmetry occurs only once per rotation thereof, and the posture thereof can be specified primarily. Thus computations can be accomplished with high accuracy. In the case where the imaginary sphere is rotated at 180 degrees, there are two positions of symmetry per rotation thereof. Thus when the posture of the imaginary sphere is specified, two postures are present and thus the posture cannot be specified primarily. However the same pattern can be repeated twice, and marks can be given efficiently to the surface of the imaginary sphere. In the case where the imaginary sphere is rotated at 120 degrees, there are three positions of symmetry per rotation thereof. In the case where the imaginary sphere is rotated at 90 degrees, there are four positions of symmetry per rotation thereof. As such, the burden of giving marks to the surface of the imaginary sphere decreases gradually from the rotation at 360 degrees to 90 degrees.

If marks are given collectively to the surface of the imaginary sphere in the above-described manner, it is conceivable that there may be a case where the posture of the imaginary sphere cannot be specified because the marks become located at the rear side in an observation direction. Therefore not less than 10marks nor more than 100 marks are given to the entire surface of the imaginary sphere. If the number of marks is less than 10, the number of marks that can be read in the observation direction is so small that there is a possibility that the posture of the imaginary sphere cannot be specified. On the other hand, if the number of the marks is more than 100, it takes long to perform computations, and thus computation efficiency becomes low.

Spheres that are measured by the measuring method includes balls for ball games such as a golf ball, a tennis ball, and the like. The measuring method is useful for analyzing the rotational and flight characteristics of balls for ball games.

It is fundamentally difficult to obtain a clear image of the contour of the ball by photographing the ball. Thus it is preferable to measure the rotational characteristic of the ball without using the data of the contour of the ball image. When the ball is photographed on a film at an end thereof, the right part or left part of the ball is shaded by the influence of a stroboscope. Thus it is preferable to measure the rotational characteristic of the ball without using the data of the contour of the ball image.

The present invention provides a measuring apparatus of measuring rotational and flight characteristics of a sphere, including a photographing means capable of photographing the sphere in various directions; a recording means for recording two-dimensional images of the sphere obtained by the photographing means; and a computing means for generating an imaginary sphere, similar to the sphere, at coordinates in a three-dimensional space and specifying a three-dimensional posture of the sphere and a three-dimensional position thereof, based on the imaginary sphere and the two-dimensional images of the sphere to find the rotational and flight characteristics of the sphere. The computing means has a coordinate conversion program capable of deriving a relationship between three-dimensional coordinates and two-dimensional coordinates by using at least one photographing means; and a posture recognition program for displacing a posture of the imaginary sphere in such a way that coordinate values of the marks present on the two-dimensional images of the sphere are coincident with coordinate values of two-dimensional imaginary marks found by converting positions of the marks given to a surface of the imaginary sphere formed at the coordinates in the three-dimensional space and specifying the three-dimensional posture of the sphere and a three-dimensional position thereof, according to an amount of the posture displacement operation relative to a reference posture of the imaginary sphere and a reference position thereof.

The measuring apparatus of the present invention for measuring the rotational and flight characteristics of the sphere has the photographing means, the recording means, and the computing means having the coordinate conversion program and the posture recognition program. Therefore the measuring apparatus is most suitable for carrying out the method of measuring the rotational and flight characteristics of the sphere. The measuring apparatus is capable of measuring the posture of the sphere and the rotational and flight characteristics thereof with high precision.

It is preferable that the computing means has an optimization program computing a displacement amount of the posture of the imaginary sphere relative to the reference posture and reference position thereof, based on the genetic algorithm. Because the computing means has the computing program performing the above-described computation, according to the genetic algorithm, the computing means is capable of performing computations easily by carrying out the measuring method using the genetic algorithm, thus having high computation accuracy.

It is preferable that the photographing means has a construction capable of photographing the rotating or moving sphere at a plurality of times at predetermined intervals.

More specifically, to obtain the two-dimensional image of the actual sphere, it is necessary for the measuring apparatus to have the photographing means such as a still camera, a CCD camera or the like for capturing the image and the recording means such as a film, an image memory or the like for recording the image. In addition, micro-flashes are used to obtain a ball image in an instantaneous still state by utilizing the difference between the luminance of one micro-flash and that of the other micro-flash in short-time emission. In the case where the sphere moving at a speed as high as 10 m/s or more is measured, it is possible to obtain a still image without a blur occurring, by using a high-speed shutter or a micro-flash.

It is preferable to use two cameras as the photographing means. It is preferable that the interval therebetween is easily alterable without calibration. It is possible to make an angular change large by making the interval therebetween and the interval between photographing times comparatively long. Thereby the number of rotations of the sphere can be measured with high accuracy. By using two cameras, it is easy to recognize which of marks present on another image of the sphere is coincident with a particular mark present on one image thereof. Thus automation can be facilitated. One or a plurality of the photographing means can be used to obtain the two-dimensional image of the sphere.

To obtain a plurality of images, it is necessary to capture the image of the sphere at least twice. To do so, one camera may be used and light is emitted by a micro-flash at a plurality of times to obtain a plurality of sphere images on one picture or obtain one sphere image on each of a plurality of pictures. It is possible to use a plurality of cameras so that the cameras photograph the sphere at predetermined intervals to obtain a two-dimensional image respectively. In this case, it is necessary to specify a coordinate axis common to the images by calibration or the like.

The following means are used to obtain the position of the mark given to the surface of the sphere on the basis of the image thereof obtained by the photographing means: In the case where a film is used as the recording means, the following methods are known: A primitive method of measuring the position of the mark by applying a scale to a developed photograph; and a method of measuring the position of the mark by applying a measuring cursor to the computer screen by using a film or an image input device such as a scanner capable of capturing the image of a photograph into the computer. In the case where an image memory is used as the recording means, data stored in the image memory is read onto the computer screen, and the position of the mark is measured with the measuring cursor. That is, so long as the two-dimensional position of each mark is obtained on the image of the sphere, the measuring method is not limited to a specific one, but any of the above-described methods can be used.

DETAILED DESCRIPTION OF THE PREFERRED EMBODIMENTS

The embodiments of the present invention will be described below with reference to drawings.

Figure 1A:
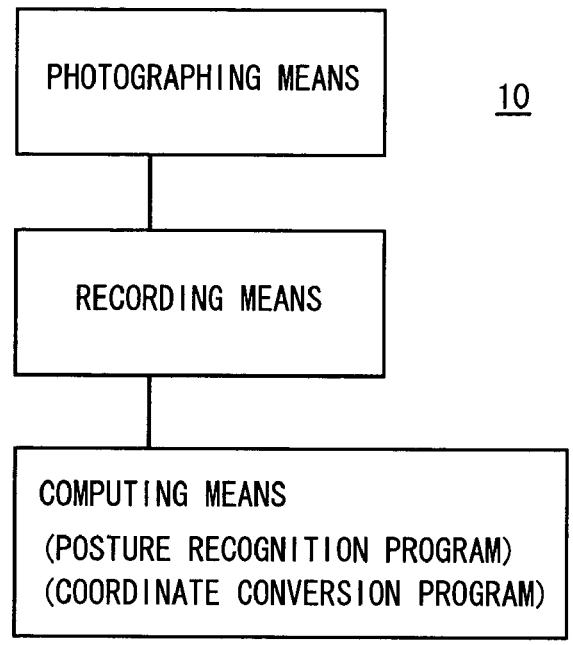
FIG. 1A shows the construction of a measuring apparatus of the present invention for measuring rotational and flight characteristics of a sphere.

FIG. 1A shows the construction of an apparatus 10 for carrying out the method of the present invention of measuring the rotational and flight characteristics of a sphere.

The measuring apparatus 10 includes a photographing means capable of photographing the sphere in various directions; a recording means for recording two-dimensional images of the sphere obtained by the photographing means; and a computing means for generating an imaginary sphere similar to the sphere at coordinates in a three-dimensional space and specifying a three-dimensional posture of the sphere and a three-dimensional position thereof, based on the imaginary sphere and the two-dimensional images of the sphere to find the rotational and flight characteristics of the sphere.

The computing means has a coordinate conversion program capable of deriving a relationship between three-dimensional coordinates and two-dimensional coordinates by using at least one photographing means; and a posture recognition program for displacing a posture of the imaginary sphere in such a way that coordinate values of the marks present on each of the two-dimensional images of the sphere are coincident with coordinate values of two-dimensional imaginary marks found by converting positions of the marks given to a surface of the imaginary sphere formed at the coordinates in the three-dimensional space and specifying the three-dimensional posture of the sphere and a three-dimensional position thereof, according to an amount of the posture displacement operation relative to a reference posture of the imaginary sphere and a reference position thereof.

Figure 1B:
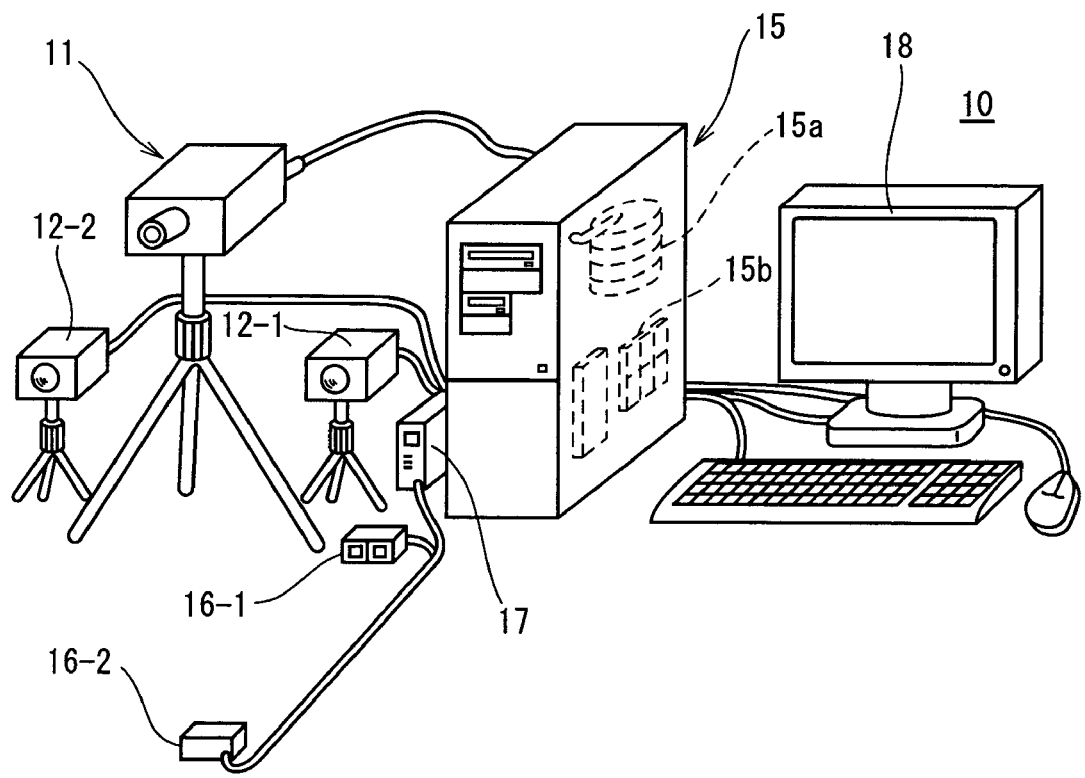
FIG. 1B is a schematic perspective view showing the measuring apparatus.

As shown in FIG. 1B, as the photographing means of the measuring apparatus 10, a CCD camera 11 and two micro-flashes 12-1, 12-2 are used. The sphere is photographed by the CCD camera 11. An image memory 15b serving as the recording means stores data of a plurality of images of the sphere obtained sequentially. The image memory 15b is disposed inside the computer 15 serving as the computing means.

The micro-flashes 12-1, 12-2 flash sequentially at a predetermined interval when the sphere is photographed. Then the image data is stored into the image memory 15b. Thereby the image memory 15b obtains a picture in which two two-dimensional images of the sphere are present. To allow the micro-f lashes 12-1 and 12-2 to f lash at a predetermined timing, trigger signals generated by photo-electric tube switches 16-1, 16-2 are applied to the micro-flashes 12-1 and 12-2 through a retarder 17.

In addition to the image memory 15b, the computer 15 of the measuring apparatus 10 has a central processing unit (CPU), a memory, and a hard disk 15a serving as a storage device. The hard disk 15a has the coordinate conversion program, the posture recognition program, and an optimization program for computing a posture displacement amount of the imaginary sphere relative to the reference posture and the reference position thereof, according to the genetic algorithm.

Figure 2:
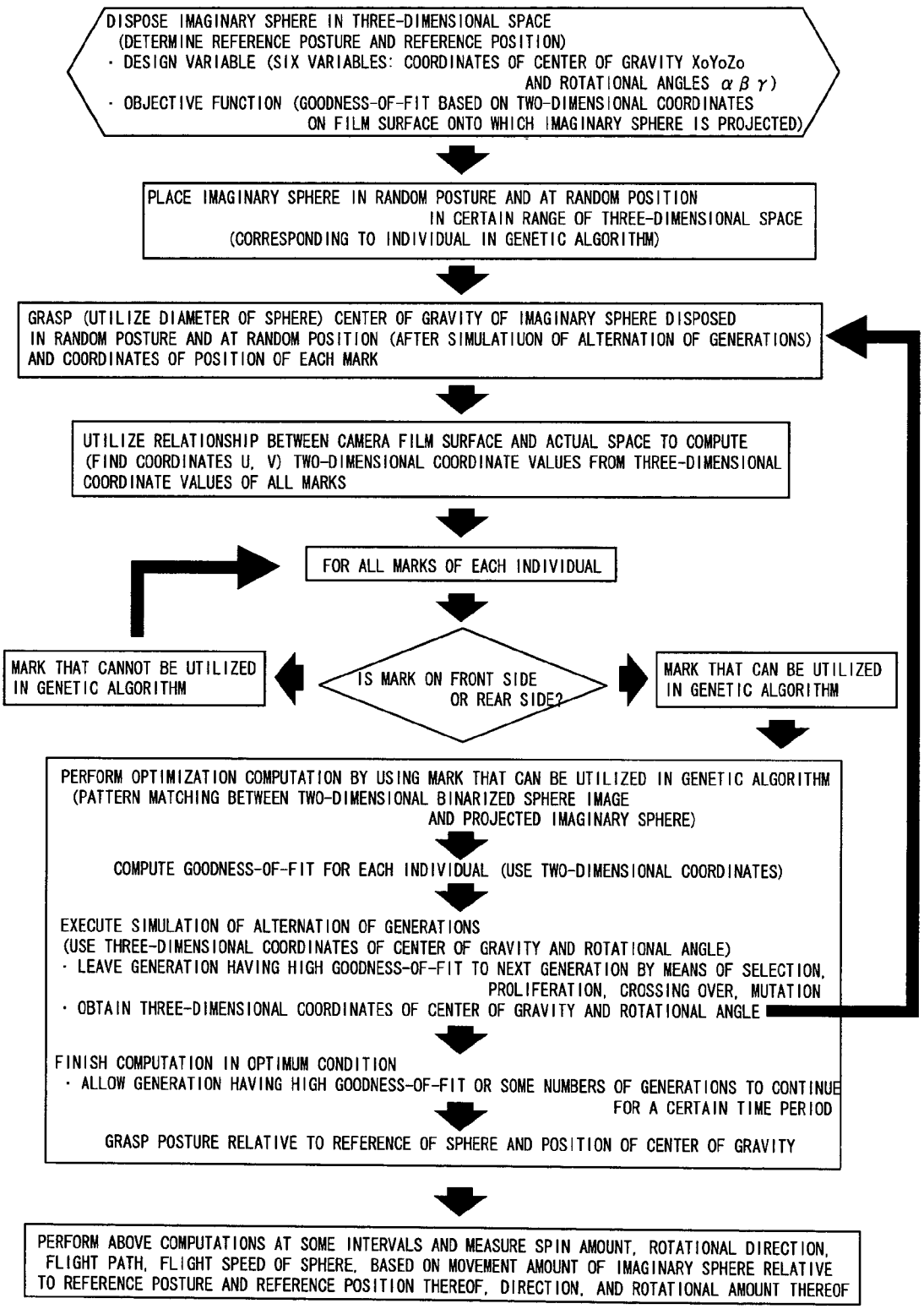
FIG. 2 is a flowchart showing a method of the present invention for measuring the rotational and flight characteristics of the sphere.

The posture recognition program, the coordinate conversion program, and the optimization program are produced, based on the flowchart shown in FIG. 2.

That is, an imaginary sphere is generated in an imaginary three-dimensional space on the basis of a sphere to be measured in its rotational and flight characteristics. A plurality of marks is given to the imaginary sphere as in the case of the sphere. An arbitrary posture of the imaginary sphere and an arbitrary position thereof are set as a reference posture and a reference position respectively.

The relationship between three-dimensional coordinates and two-dimensional coordinates is derived by using at least one photographing means. By using the relationship, positions of the marks given to the surface of the imaginary sphere formed at the coordinates in the three-dimensional space are converted into positions on a two-dimensional image to find coordinate values of two-dimensional imaginary marks and find coordinate values of the marks present on the two-dimensional images of the sphere.

Thereafter an operation of displacing the posture of the imaginary sphere relative to the reference posture and the reference position is performed in such a way that the coordinate values of the two-dimensional imaginary marks and the coordinate values of the marks present on the two-dimensional images of the sphere are coincident with each other to specify a three-dimensional posture of the sphere and a three-dimensional position thereof for each of the two-dimensional images of the sphere, according to an amount of the posture displacement operation.

Finally, the rotational and flight characteristics of the sphere are computed, according to the three-dimensional posture and position of the sphere specified for each of the two-dimensional images of the sphere at one time and the three-dimensional posture and position thereof at another time.

In addition to the above-described processing, the method of measuring the rotational and flight characteristics of the sphere includes a binarization step of converting the two-dimensional image obtained by photographing the sphere into binary data of white and black.

The displacement amount of the imaginary sphere in the posture displacement operation is programmed in the optimization program for performing computations in accordance with the genetic algorithm in such a way that the displacement amount is specified by using computations based on the genetic algorithm. The three-dimensional posture of the sphere is specified for each two-dimensional image thereof in finding the rotational and flight characteristics thereof.

The method of measuring the rotational and flight characteristic of the sphere to be carried out by the measuring apparatus is described in detail below.

Figure 3A:
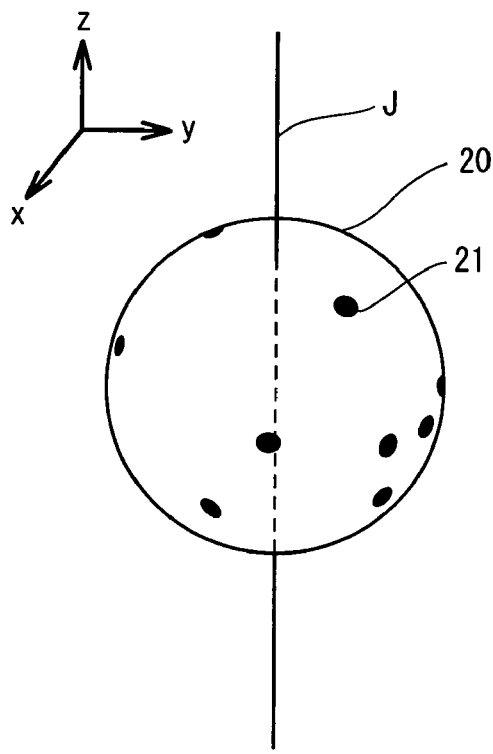
FIG. 3A is a perspective view showing positions of marks given to the sphere.
Figure 3B:
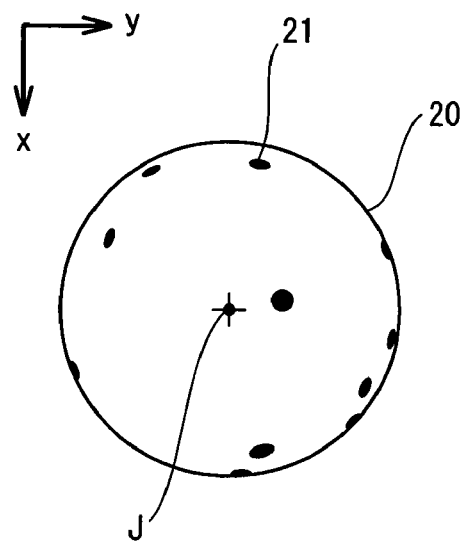
FIG. 3B is a plan view showing the positions of the marks given to the sphere.
Figure 3C:
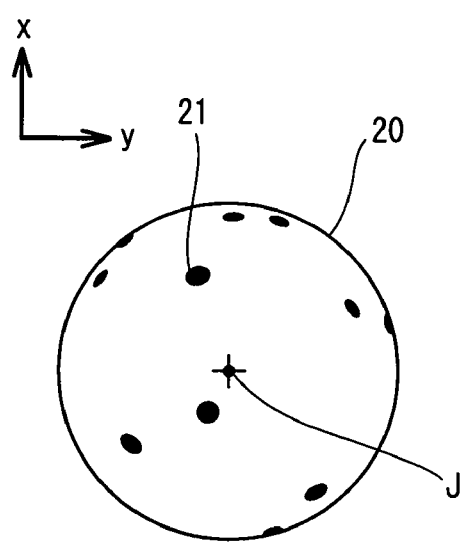
FIG. 3C is a bottom view showing the positions of the marks given to the sphere.

A golf ball 20 is used as the sphere to be measured in its rotational characteristic and the like. Before a measuring operation is performed, as shown in FIGS. 3A, 3B, and 3C, a large number of black marks 21 are given to the surface of the golf ball 20.

In this case, the marks 21 are so given as to allow them to be symmetrical once with respect to a rotational axis J of the golf ball 20, when the golf ball 20 rotates on the rotational axis J at an angle obtained by dividing 360° by one. That is, the golf ball 20 becomes symmetrical once with respect to the rotational axis J in the operation of rotating it. The marks 21 are given to the surface of the golf ball 20 at random.

Figure 4:
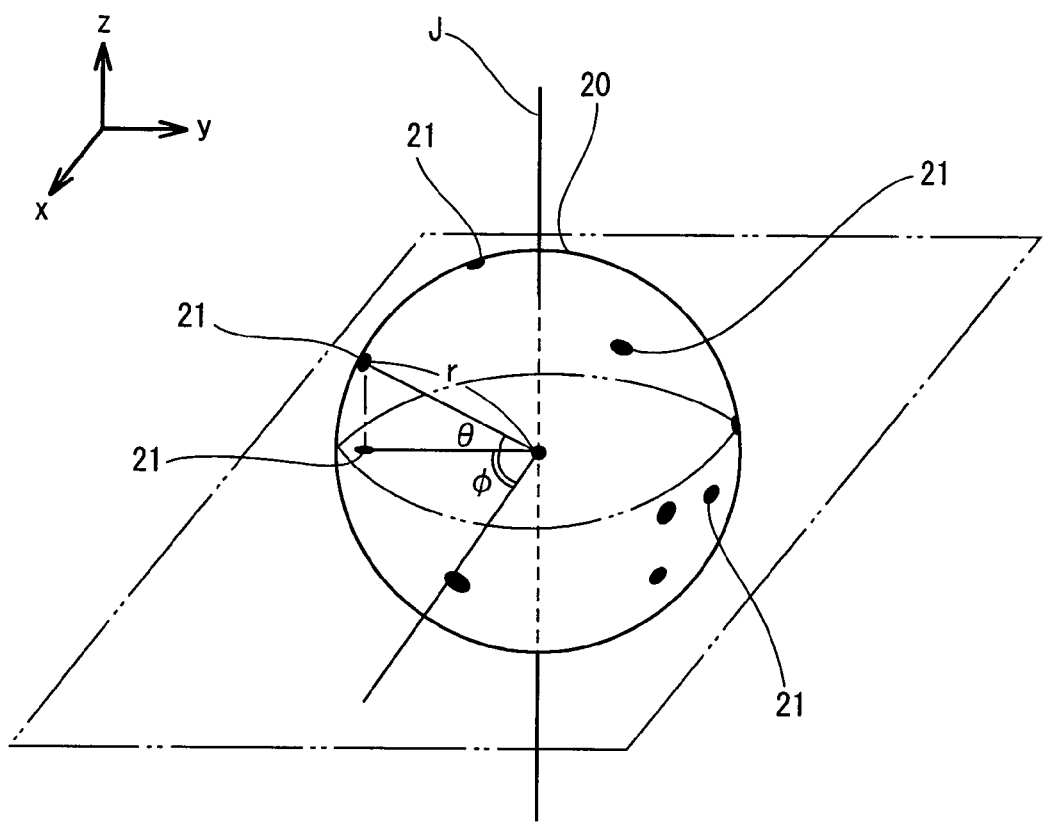
FIG. 4 is an explanatory view showing polar coordinates of the sphere.

The three-dimensional coordinate values of each mark 21 given to the surface of the golf ball 20 in the above-described manner are read with a three-dimensional measuring device. As the coordinate for reading the three-dimensional coordinate values of each mark 21, a polar coordinate (coordinate value r in radial direction, angle θ in meridian direction, and angle φ in azimuth direction) is adopted, as shown in FIG. 4.

Figure 5:
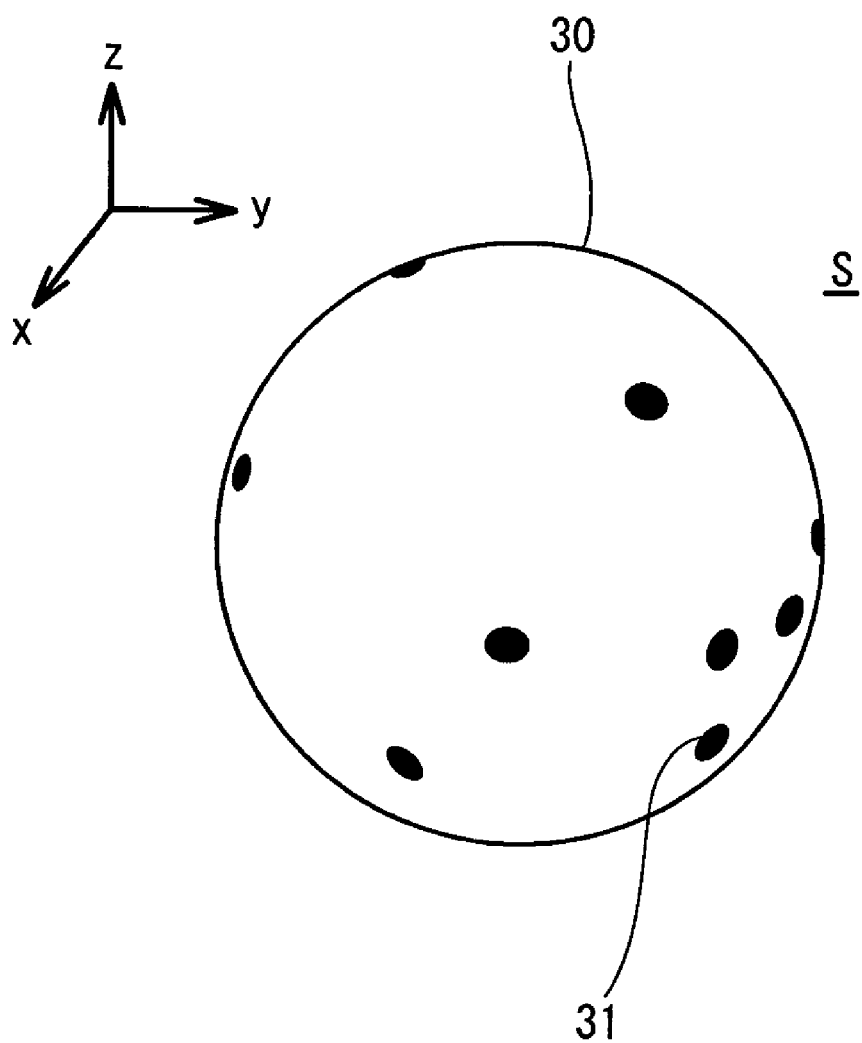
FIG. 5 is a schematic view showing an imaginary sphere to which marks are given.

As shown in FIG. 5, the posture recognition program disposed inside the computer 15 is operated to form an imaginary golf ball 30 similar to the golf ball 20 at coordinates in an imaginary three-dimensional space S of a screen 18 of the computer 15 and give marks 31 to the surface of the imaginary golf ball 30 at positions corresponding to the read numerical values of the marks 21 of the golf ball 20 on the polar coordinate (r, θ,φ). In the posture recognition program, computations are performed by converting polar coordinate values into rectangular coordinate values. In the posture recognition program, a given posture of the imaginary golf ball 30 thus formed is set as the reference posture.

Description is made on the method of deriving and grasping the relationship between the two-dimensional coordinates and the three-dimensional coordinates and finding the relationship among the positions of the marks on the film surface (two-dimensional) of the camera on the basis of the positions of the marks on the imaginary sphere. That is, the spatial coordinates are converted into the coordinates of the camera.

Figure 6:
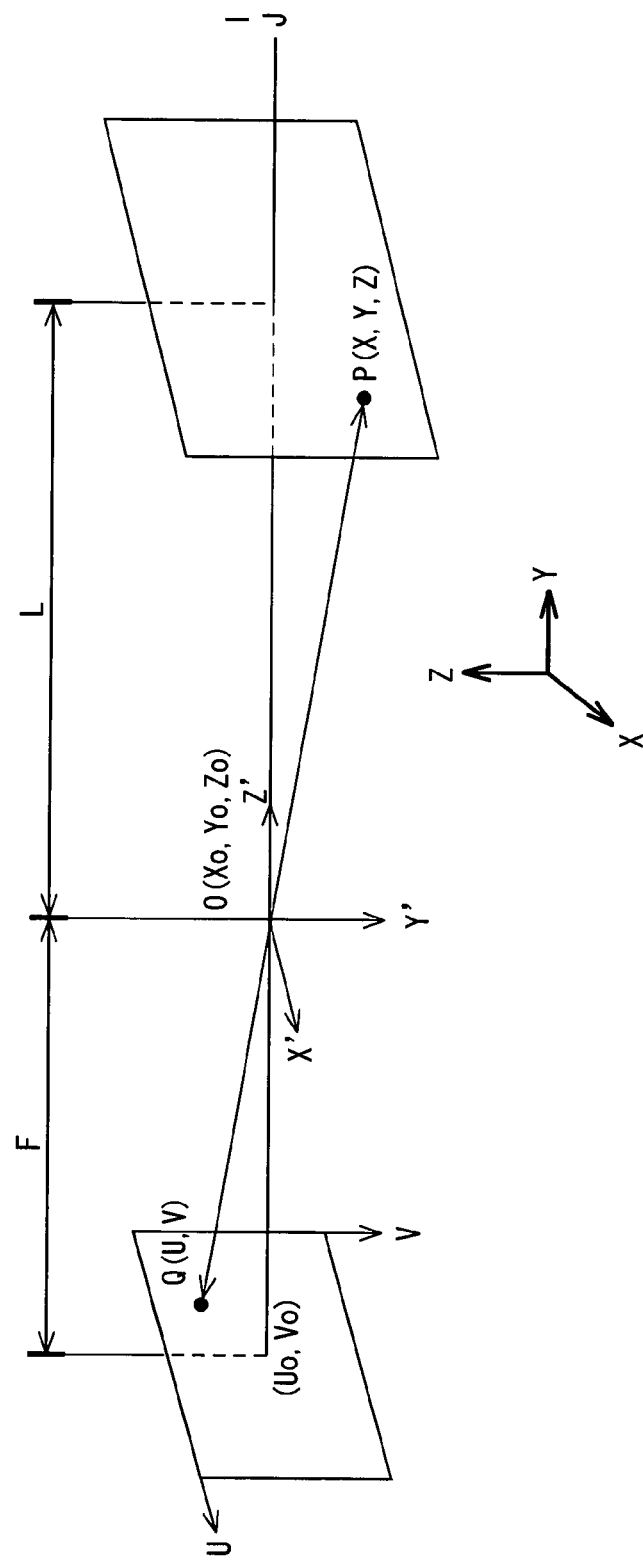
FIG. 6 shows the relationship between coordinates in a three-dimensional actual space and coordinates on a two-dimensional image.

FIG. 6 shows the positional relationship between the coordinates in the actual three-dimensional space and the coordinates on the two-dimensional image. Detailed description of variables is made below.

Arbitrary axes are set in the actual space. The coordinates of a point P are set to (X, Y, Z). The coordinates of the center of a lens are set to (Xo, Yo, Zo).

The distance between a plane which includes the point P and is vertical to an optical axis and the center of the lens is set to L. The distance between the surface of a film and the center of the lens is set to F.

An arbitrary coordinate axis is set on the film surface. The coordinates of an image Q of the point P on the film surface are set to (U, V). The coordinates of the intersection of the optical axis and the film surface are set to (Uo, Vo).

Let a coordinate system (X', Y', Z') be considered. The origin of the coordinate system is at the center O of the lens. A Z-axis thereof is parallel with the optical axis. An X-axis and a Y-axis thereof are parallel with a U-axis and a V-axis respectively. A matrix obtained by conversion from the coordinates (XYZ coordinate) of the actual space into the coordinate system (X', Y', Z') is set as M ($m_{ij}$:I=1 to 3, j=1 to 3). The conversion matrix M conforms to Euler's theorem. Therefore the conversion matrix M is expressed by an equation 1 shown below:

$$\begin{bmatrix} m_{11} & m_{12} & m_{13} \\ m_{21} & m_{22} & m_{23} \\ m_{31} & m_{32} & m_{33} \end{bmatrix} = \begin{bmatrix} \cos\varphi\cos\theta\cos\psi - \sin\varphi\sin\psi & \sin\varphi\cos\theta\cos\psi + \cos\varphi\sin\psi & -\sin\theta\cos\varphi \\ -\sin\varphi\cos\theta\cos\psi - \cos\varphi\sin\psi & -\sin\varphi\cos\theta\sin\psi + \cos\varphi\cos\psi & \sin\theta\sin\psi \\ \sin\theta\cos\varphi & \sin\theta\sin\psi & \cos\theta \end{bmatrix}$$

$$= \begin{bmatrix} m_{11} & m_{12} & m_{13} \\ -m_{12} & m_{22} & m_{23} \\ -m_{13} & m_{23} & m_{33} \end{bmatrix}$$

To directly express the relationship between the point P in the actual space and the image Q of the point P, the relationship therebetween should be expressed by the same coordinate system. An equation 2 shown below is obtained by using the conversion matrix M obtained by conversion from the actual space into the coordinate system in which the Z-axis is parallel with the optical axis, and the X-axis and the Y-axis are parallel with the U-axis and the V-axis respectively.

$$\vec{OP} = M \cdot \begin{pmatrix} X - X_0 \\ Y - Y_0 \\ Z - Z_0 \end{pmatrix}, \quad \vec{OQ} = \begin{pmatrix} U - U_0 \\ V - V_0 \\ -F \end{pmatrix} \quad \text{Equation 2}$$

Vectors OP and OQ are disposed on the same line. The ratio of the vector OP to the vector OQ is L/F. Thus an equation 3 is obtained as shown below.

$$\vec{OQ} = -\frac{F}{L}\vec{OP} \quad \text{Equation 3}$$

The equation 2 is substituted into the equation 3 to find L from one equation of the three equations. The found L is substituted into the other two equations to thereby obtain an equation 4 shown below:

$$U - U_0 = -F\frac{m_{11}(X - X_0) + m_{12}(Y - Y_0) + m_{13}(Z - Z_0)}{-m_{13}(X - X_0) + m_{23}(Y - Y_0) + m_{33}(Z - Z_0)} \quad \text{Equation 4}$$

$$V - V_0 = -F\frac{m_{12}(X - X_0) + m_{22}(Y - Y_0) + m_{23}(Z - Z_0)}{-m_{13}(X - X_0) + m_{23}(Y - Y_0) + m_{33}(Z - Z_0)}$$

An equation 5 shown below is obtained by grouping variables of the equation 4 and arranging them for U, V, X, Y, and Z.

$$U = \frac{A_1X + A_2Y + A_3Z + A_4}{C_1X + C_2Y + C_3Z + 1}, \quad V = \frac{B_1X + B_2Y + B_3Z + B_4}{C_1X + C_2Y + C_3Z + 1} \quad \text{Equation 5}$$

When six coordinates (X, Y, Z) and six coordinates (U, V) are obtained, 11 coefficients can be computed by substituting the obtained six coordinates (X, Y, Z) and six coordinates (U, V) into the equation 5, supposing that two cameras are used. However, it is desirable to measure not less than six known coordinates of the actual space to prevent influence of measurement errors. When one camera is used, it is necessary to obtain not less than 12 coordinates (X, Y, Z) and 12 coordinates (U, V). When three cameras are used, it is necessary to obtain not less than 4 coordinates (X, Y, Z) and 4 coordinates (U, V).

Figure 7:
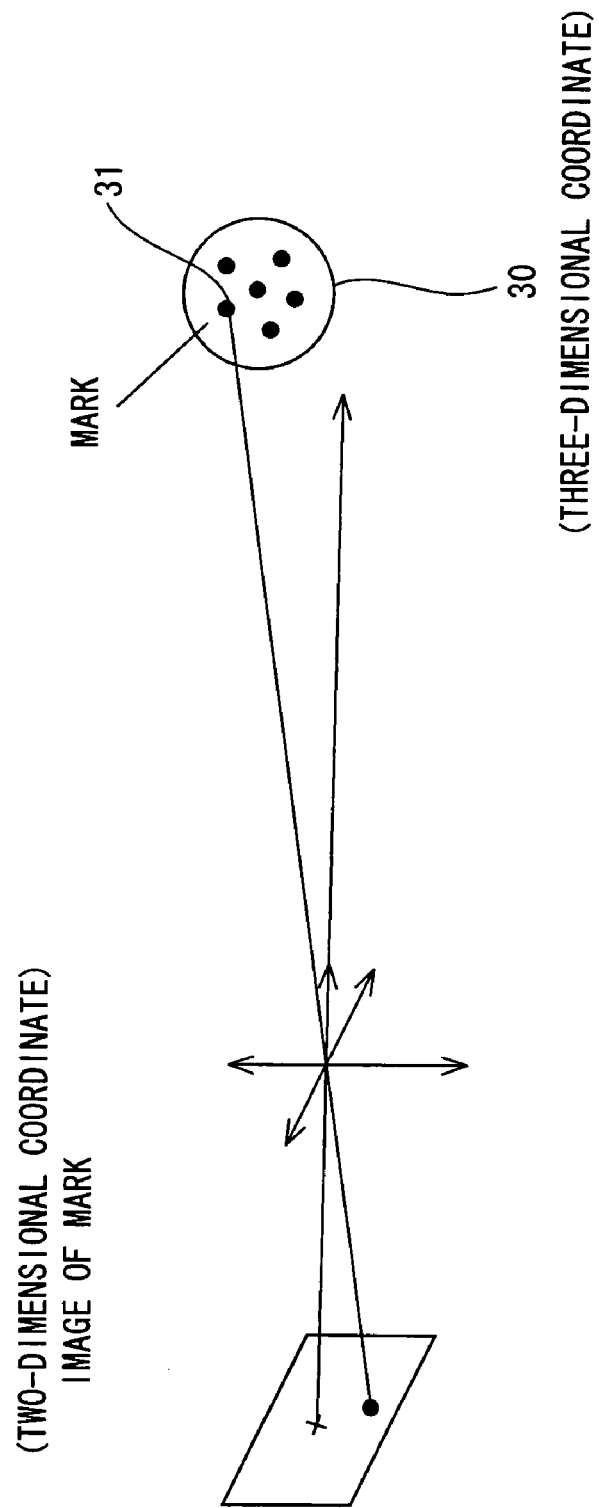
FIG. 7 shows a method of converting positions of marks given to an imaginary sphere formed at coordinates of a three-dimensional space into coordinates on a two-dimensional image.
Figure 8:
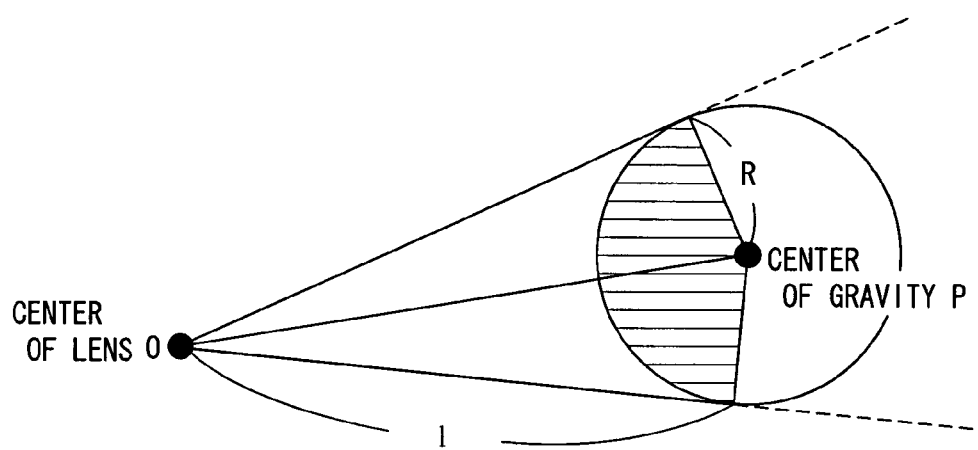
FIG. 8 shows the relationship between the center of a lens and a sphere.

By carrying out the above-described method, it is possible to grasp the relationship between known coordinates of the actual space and coordinates on the two-dimensional image. As shown in FIG. 7, by utilizing the relationship, it is possible to find two-dimensional coordinates on the film surface of the camera, based on the coordinates of marks given to the surface of the imaginary sphere on the computer screen. That is, it is possible to convert the position of marks 31 given to the surface of the imaginary golf ball 30 formed at coordinates of a three-dimensional space into positions on the two-dimensional image.

Description is made below on the method of determining whether when the mark on the imaginary three-dimensional sphere is projected on the two-dimensional coordinates, the mark is present on the two-dimensional image on the film surface (whether mark is present at front side or rear side).

The method of determining whether the mark is present on the front side or the rear side (see the flowchart of FIG. 2) is described below. Three-dimensional coordinates of the camera lens are computed by utilizing 11 coefficients found by using the equation 5.

Supposing that the center O of the lens is denoted as (Xo, Yo, and Zo) and that the center of gravity P of the imaginary sphere is denoted as (Gx, Gy, and Gz), the vector OP is as shown by an equation 6 shown below.

$$\vec{OP} = \begin{pmatrix} G_x - X_0 \\ G_y - Y_0 \\ G_z - Z_0 \end{pmatrix} \quad \text{Equation 6}$$

Using the vector OP and the radius R of the sphere, the length l of a tangent drawn from the center of the lens to the sphere is shown by an equation 7.

$$l = \sqrt{(G_x - X_0)^2 + (G_y - Y_0)^2 + (G_x - Z_0)^2 - R^2} \quad \text{Equation 7}$$

When an oblique-line portion of the imaginary sphere is projected two-dimensionally, a mark that can be actually photographed is defined as the front side and marks other than that a redefined as the rear side. Supposing that the length between the center of the lens and the mark on the imaginary sphere is L, the length L is determined by the positional relationship between the position of the center of gravity of the imaginary sphere and each of the known marks.

L<l: A mark on the sphere is in the direction (front side) of an image that can be measured actually. The mark is utilized in the computation using the genetic algorithm.

L≧l: A mark on the sphere is in the direction (rear side) of an image that cannot be measured actually. The mark is not utilized in the computation using the genetic algorithm.

The above-described method allows determination as to whether all the marks on the imaginary sphere can be used in the computation using the genetic algorithm. However, it is necessary to find the central position O (Xo, Yo, and Zo) of the lens. Thus the central position of the lens is determined by using the equations 4 and 5. An equation 8 shown below is established from the above equations.

$$C_1 = -m_{13}/\alpha, C_2 = m_{23}/\alpha, C_3 = m_{33}/\alpha$$

$$\alpha = m_{13}X_0 - m_{23}Y_0 - m_{33}Z_0$$

$$A_1 = -U_0 m_{13} - F' m_{11}$$

$$A_2 = U^0 m_{23} - F' m_{12}$$

$$A_3 = U_0 m_{33} - F' m_{13}$$

$$A_4 = (F' m_{11} + U_0 m_{13})X_0 + (F' m_{12} - U_0 m_{23})Y_0 + (F' m_{13} - U_0 m_{33})Z_0$$

$$F' = F/a$$

$$B_1 = -V_0 m_{13} + F' m_{12}$$

$$B_2 = V_0 m_{23} - F' m_{22}$$

$$B_3 = V_0 m_{33} - F' m_{23}$$

$$B_4 = (-F' m_{12} + V_0 m_{13})X_0 + (F' m_{22} - V_0 m_{23})Y_0 + (F' m_{23} - V_0 m_{23})Z_0 \quad \text{Equation 8}$$

The equation 8 has 12 variables, but has 11 equations. Therefore Xo, Yo, and Zo cannot be found. The determinant of the conversion matrix M is computed and a relational expression of an equation 9 is added. Thereby 14 variables can be found from 14 equations to thereby find Xo, Yo, and Zo.

$$\{\det M\}^2 = 1 \quad \text{Equation 9}$$

Figure 9A:
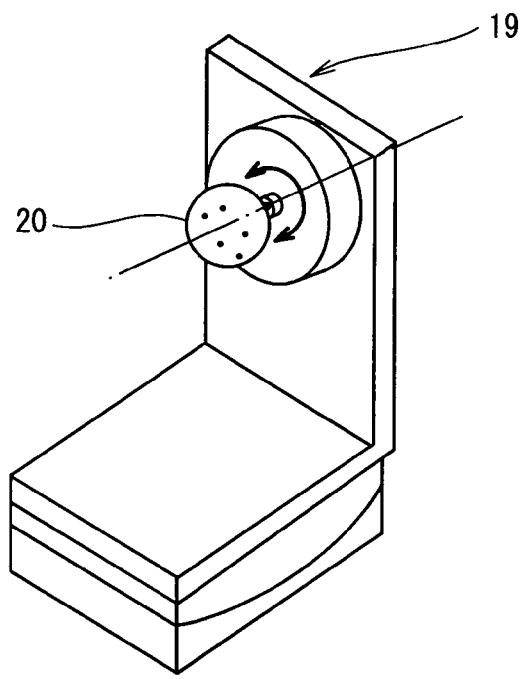
FIG. 9A is a perspective view showing an apparatus for rotating/displacing a golf ball.
Figure 9B:
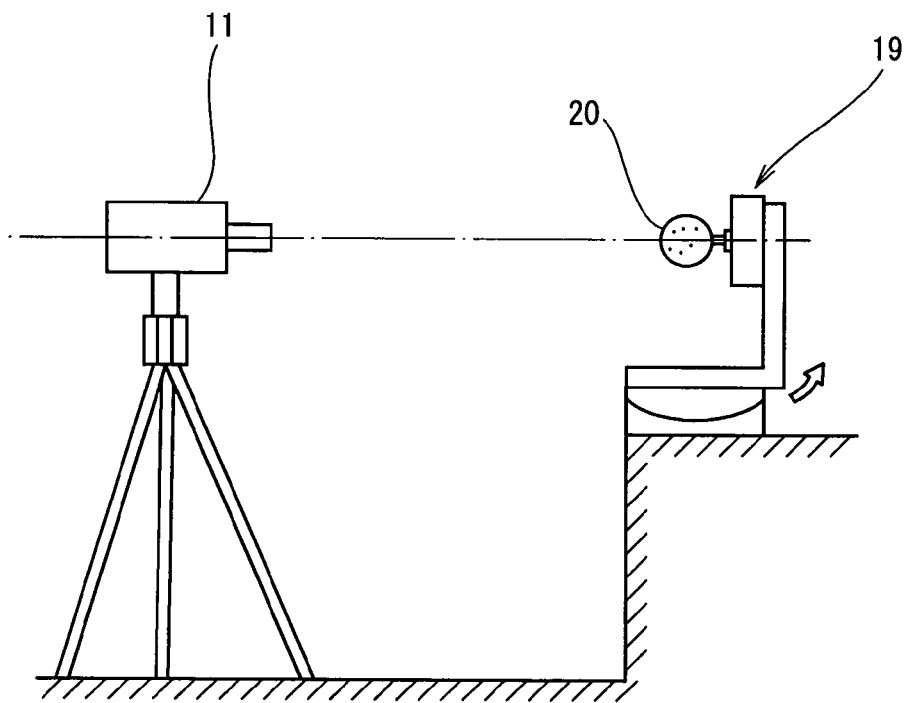
FIG. 9B is a side view showing the apparatus shown in FIG. 9A.

As shown in FIGS. 9A and 9B, a rotation apparatus 19 has the CCD camera 11 at a position where the CCD camera 11 is capable of photographing the golf ball 20 while the golf ball 20 is rotating. The distance between the CCD camera 11 and the golf ball 20 is appropriately adjusted. The magnification of the lens of the CCD camera 11 is also appropriately adjusted.

Figure 10:
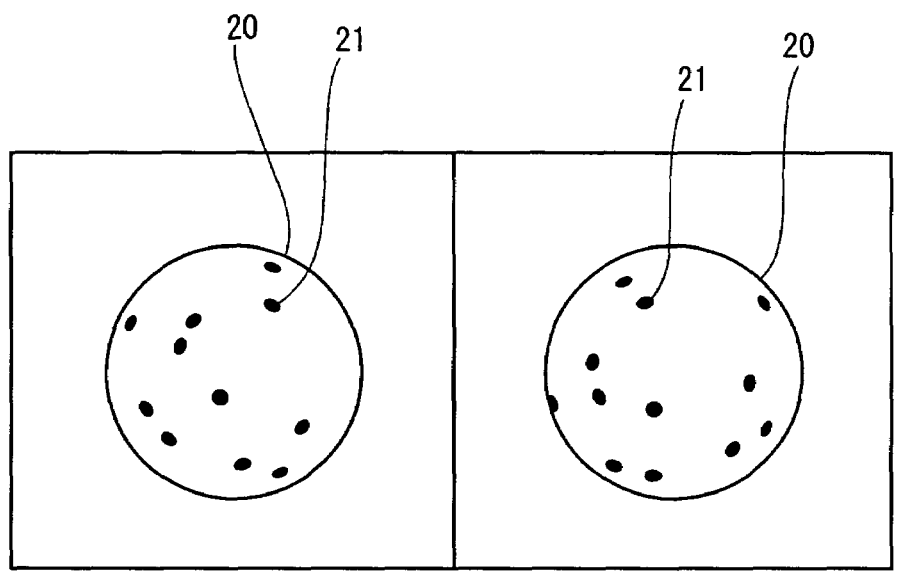
FIG. 10 shows a two-dimensional image of a sphere.

In the above-described disposed state, the micro-flashes emit respectively twice at a predetermined interval, when the golf ball 20 passes the CCD camera 11. Thereby the image memory 15b obtains a still picture in which two two-dimensional images of the golf ball 20 are formed. FIG. 10 shows the obtained two-dimensional images. The image data obtained by photographing the golf ball 20 is converted into binary data of white and black by using a binarizing program. Thereafter, on the screen 18, the two-dimensional coordinate values of each mark 21 are read. Read values are recorded on the hard disk 15a.

By using the relationship between the three-dimensional coordinates and the two-dimensional coordinates derived by the above-described method, a moving operation and a rotating operation are performed by using the posture recognition program so that two-dimensional coordinate values of the imaginary mark found by converting the position of the mark given to the surface of the imaginary sphere formed at coordinates of the three-dimensional space into a position of the two-dimensional image is coincident with the coordinate values of the mark present on the two-dimensional image obtained by photographing the golf ball 20.

Thereby the posture and position of the imaginary golf ball 30 relative to its reference posture and reference position are specified. The amount of the operation of moving and rotating the posture of the imaginary golf ball 30 is computed by using the genetic algorithm which is one of the optimizing methods.

The condition of the optimization to be performed by using the genetic algorithm is shown below.

The following six items are set as design variables: rotation angles ($\alpha$, $\beta$, $\gamma$) around each axis of the three-dimensional rectangular coordinates and the coordinate values (Xo, Yo, Zo) of the center of gravity of the imaginary golf ball 30 formed in a three-dimensional space. The numerical values of these six items are set as the six variables. It is necessary to code the design variables in optimization to be performed by using the genetic algorithm. Numerical values obtained by converting the six variables (real numbers) $\alpha$, $\beta$, $\gamma$ and Xo, Yo, Zo into 10-bit binary numbers are used as codes.

Fundamental set values in the optimization to be performed by using the genetic algorithm of the embodiment are shown below:

Number of individuals: 50

Length of chromosome: 60 bits

Number of design variables: six (10 bits per variable)

Termination condition: (computation terminates if maximum value of goodness-of-fit does not change up to 1000th generation)

Number of marks: 42

Pattern matching is executed between a two-dimensional projection chart obtained by the computer that performs the above-described operation and a two-dimensional projection chart obtained by photographing. A degree of similarity of a pattern at this time is defined by an equation 10 shown below. The equation 10 is set as an objective function. A maximum value of the objective function is searched by using the genetic algorithm.

$$\text{Fitness} = -\sum_{i=1}^{N} \min_j (\text{distance}(X_i, Y_j))^2 \quad \text{Equation 10}$$

In the equation 10, Xi is two-dimensional coordinates (origin is at coordinate of center of sphere (ball)) of a mark of the photographed projection chart; Yj is two-dimensional coordinates (origin is at coordinate of center of sphere) of the mark of the projection chart found by utilizing the relationship between the known coordinates of the actual space and the coordinates on the two-dimensional image, based on the position of the center of gravity of the ball in the three-dimensional space after the golf ball is rotated according to a value obtained by execution of the genetic algorithm.

The distance (a, b) is the distance between the two points (a, b); $\min_j$ is a minimum value for j (j=1 to n, n is the number of marks), and $\Sigma$ is the summation for i (i=1 to n, n is the number of marks). N is the number of the marks. A minimum value of distances between marks is computed for all marks of each image. The total of the minimum values is set as the goodness-of-fit.

Computations of the objective function is performed for each of the individuals to find the goodness-of-fit therefor.

The computer 15 repeatedly executes computations for generations to find the goodness-of-fit. When the maximum value of the goodness-of-fit remains unchanged up to 1000th generation in the computations, the computations terminate. The values of the six variables of an individual that maximizes the goodness-of-fit are determined as an optimum solution of the posture displacement of the imaginary golf ball 20. The three-dimensional posture and position of the golf ball 20 are specified by the individual. Another method may be used to finish the simulation of alternation of generations to be executed by using the genetic algorithm.

The rotation of a point on the three-dimensional coordinates is obtained by the product of a rotation matrix of 3×3 and the coordinates of the point. The rotation matrix is obtained when the value of each of the rotational angles $\alpha$, $\beta$, and $\gamma$ is determined. Thus by finding the rotation matrix, it is possible to determine the rotational amount of the golf ball relative to the reference position in each image. In optimization computations, the golf ball is rotated by varying the value of the rotational angles $\alpha$, $\beta$, and $\gamma$ in such a way as to minimize the deviation between the hit golf ball and the image thereof.

The rotation matrix of each image can be obtained by the above-described method. To find the difference between the rotational amount of one image and that of the other image, the rotation matrix of one image should be multiplied by a reciprocal of the rotation matrix of another image. Based on the rotation matrix obtained thus, the vector of the rotational axis and the rotational angle are computed.

More specifically, based on the values of the rotational angles ($\alpha$, $\beta$, $\gamma$) around the X-axis, the Y-axis, and the Z-axis of the three-dimensional space of the individual that maximizes the goodness-of-fit, a rotation matrix of three rows and three columns is found. The posture of the golf ball 20 is determined on the basis of the found rotation matrix. That is, rotation matrixes Rx, Ry, and Rz for rotating the golf ball 20 around the X-axis, the Y-axis, and the Z-axis are expressed as follows:

Equation 11

$$Rx = \begin{pmatrix} 1 & 0 & 0 \\ 0 & \cos\alpha & -\sin\alpha \\ 0 & \sin\alpha & \cos\alpha \end{pmatrix}$$
$$Ry = \begin{pmatrix} \cos\beta & 0 & \sin\beta \\ 0 & 1 & 0 \\ -\sin\beta & 0 & \cos\beta \end{pmatrix} \quad (11)$$
$$Rz = \begin{pmatrix} \cos\gamma & -\sin\gamma & 0 \\ \sin\gamma & \cos\gamma & 0 \\ 0 & 0 & 1 \end{pmatrix}$$

The rotation matrix R for specifying the posture and position of the golf ball 20 specified by the posture recognition program on the basis of the reference posture of the imaginary golf ball and the reference position thereof is expressed as follows by the rotation matrixes Rx, Ry, and Rz for rotating the golf ball 20 around the X-axis, the Y-axis, and the Z-axis respectively:

$$R = RzRyRx \qquad \text{Equation 12}$$

For other images of the golf balls 20, computations and evaluations of the goodness-of-fit similar to those described above are executed to find a rotation matrix from rotational angles ($\alpha'$, $\beta'$, $\gamma'$) specifying the posture and position of the golf ball 20.

As described above, supposing that a rotation matrix for specifying the posture of the golf ball 20 at one time specified by the equation 12 is R1, a rotation matrix for specifying the posture thereof at another time is R2, and a rotation matrix for making the posture thereof at one time coincident with the posture thereof at another time is R12, the rotation matrix R12 is found by an equation 13 shown below:

$$R_{12} = R_2 R_1^{-1} \qquad (13)$$
$$= \begin{pmatrix} r_{11} & r_{12} & r_{13} \\ r_{21} & r_{22} & r_{23} \\ r_{31} & r_{32} & r_{33} \end{pmatrix}$$

where $r_{11}$ through $r_{33}$ are elements of matrix.

Figure 11:
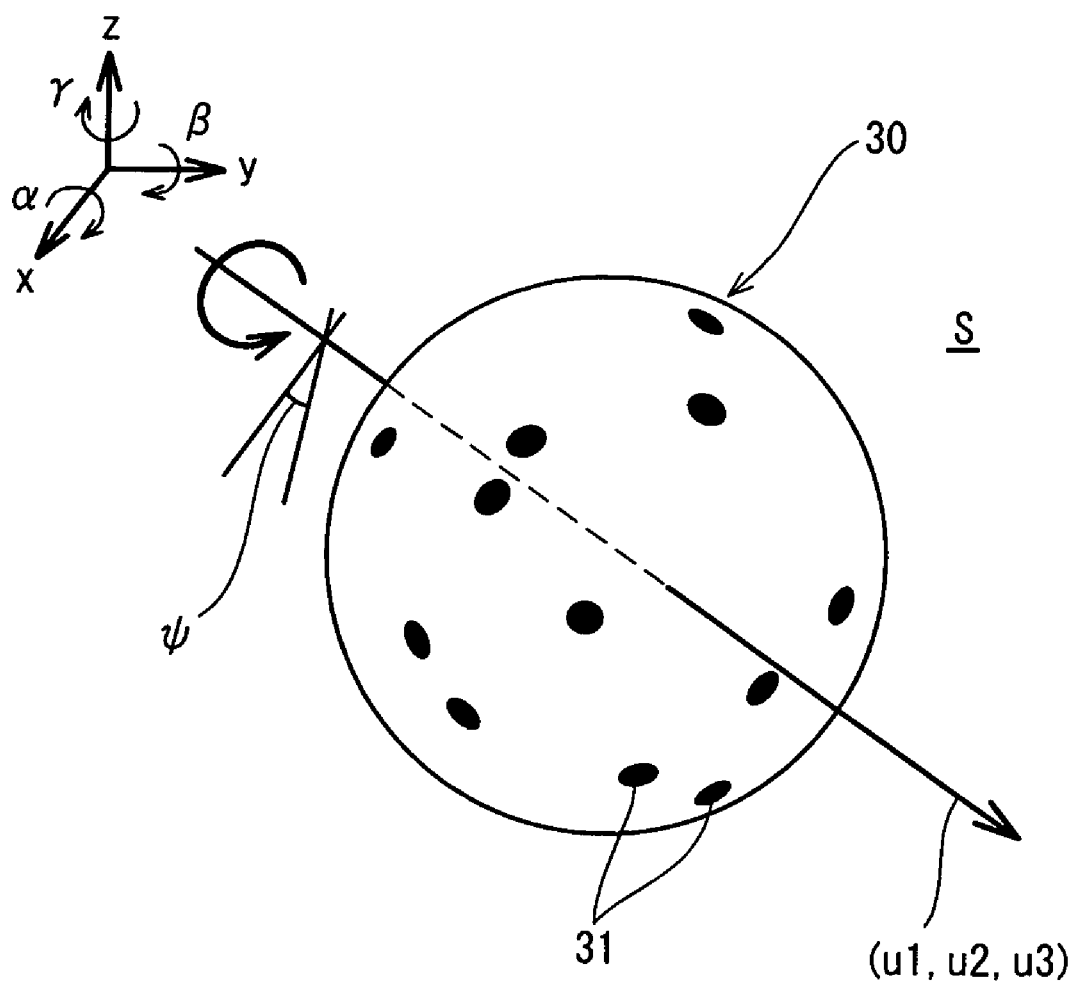
FIG. 11 is an explanatory view showing the direction of a rotational axis of the sphere and a rotational angle thereof.
Figure 12A:
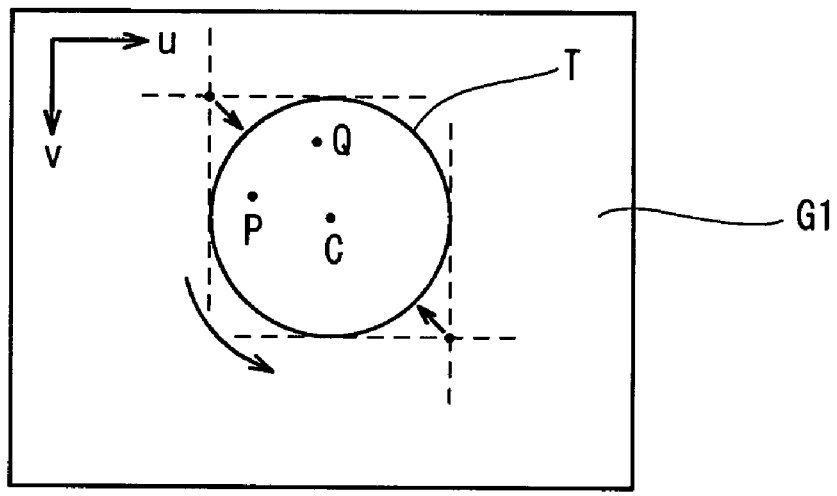
FIGS. 12A and 12B show a two-dimensional ball image to be used in a conventional measuring method.
Figure 12B:
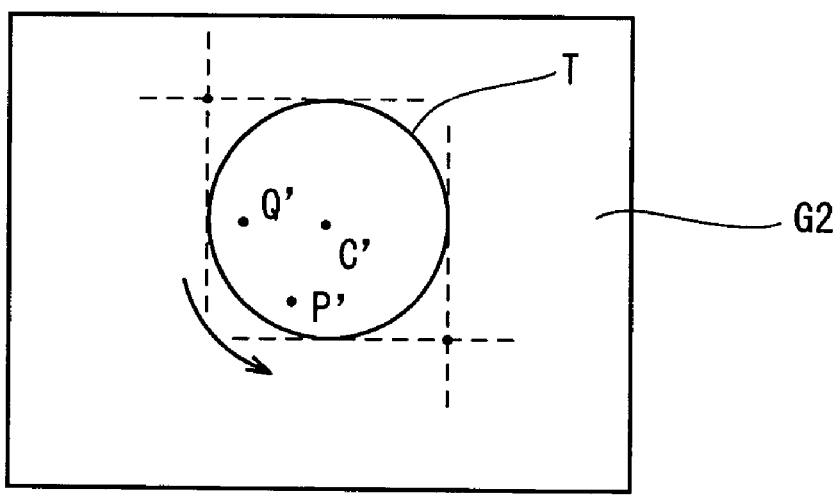
Figure 13A:
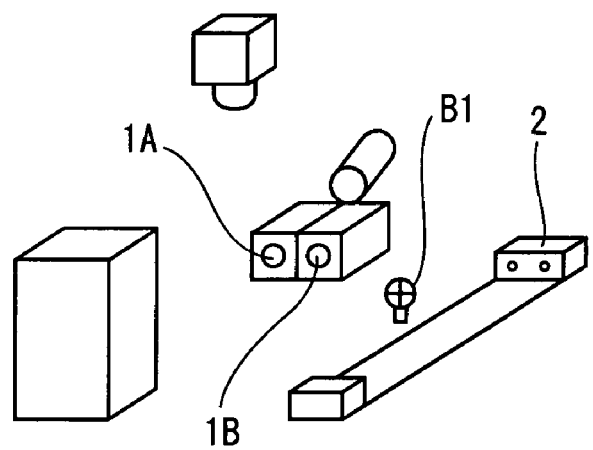
FIG. 13A is a schematic view showing another conventional measuring apparatus.
Figure 13B:
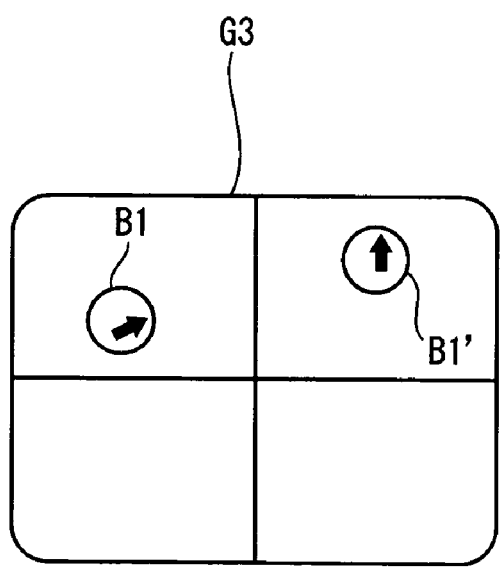
FIG. 13B shows a ball image provided by the measuring apparatus shown in FIG. 13A.
Figure 14A:
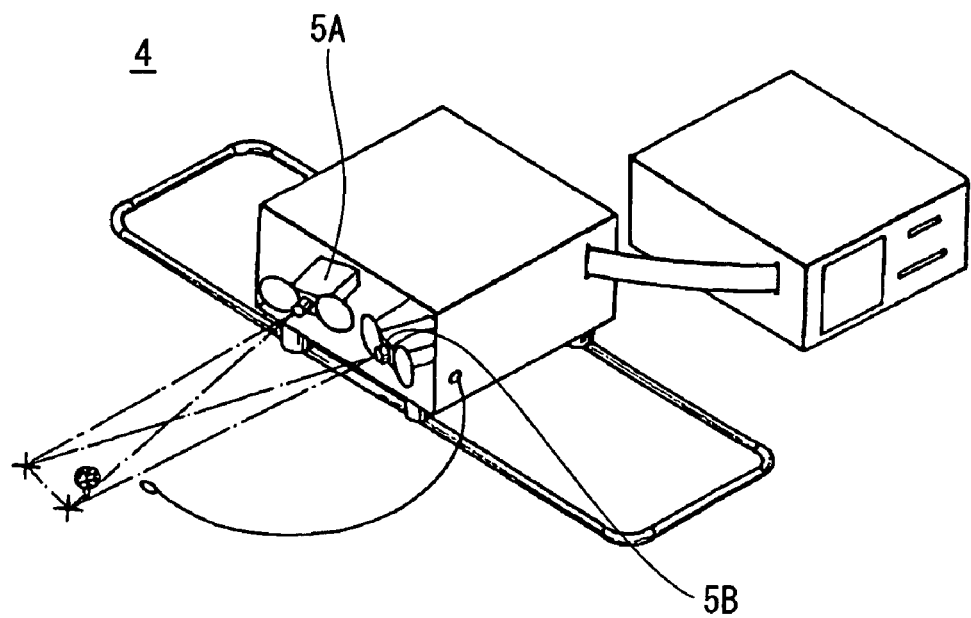
FIG. 14A is a perspective view showing another conventional measuring apparatus.
Figure 14B:
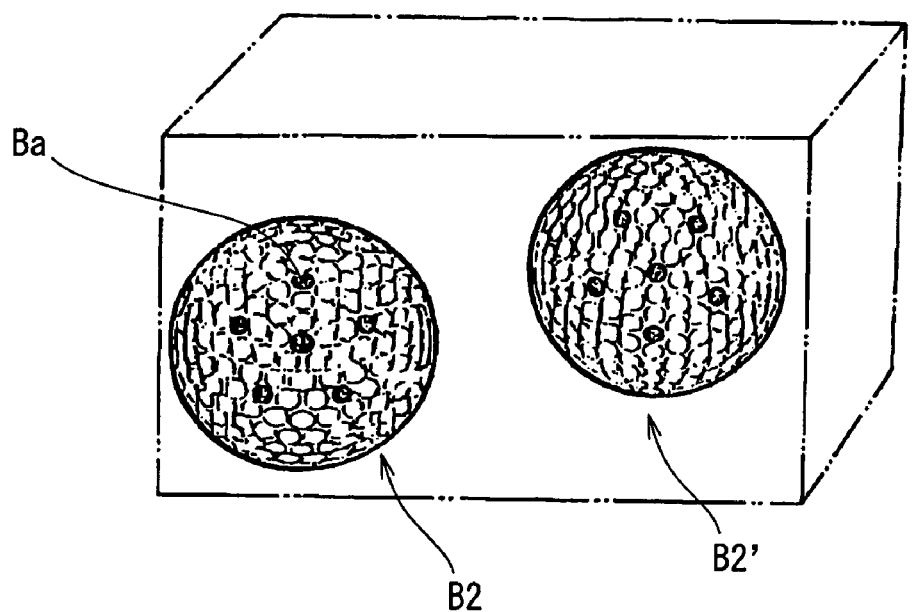
FIG. 14B is a perspective view showing a golf ball that has passed through a three-dimensional region to be measured.

Directions (u1, u2, u3) of the rotational axis (coordinate axis) and a rotational angle $\psi$ at the time of a coordinate conversion shown in FIG. 11 are found by equations 14 and 15 shown below, when the rotation matrix R12 shown by the equation 13 is determined:

Equation 14

$$(u_1, u_2, u_3) = \frac{(-r_{23} + r_{32}, r_{13} - r_{31}, -r_{12} + r_{21})}{\sqrt{(r_{23} - r_{32})^2 + (r_{13} - r_{31})^2 + (r_{12} - r_{21})^2}} \qquad (14)$$

$$\psi = \cos^{-1}\left(\frac{r_{11} + r_{22} + r_{33} - 1}{2}\right) \qquad (15)$$

The rotational amount of the golf ball 20 between one time and another time and the direction of its rotational axis are found from the rotational angle $\psi$ thus found and the interval between the time at which the golf ball is photographed to obtain one image thereof and the time at which the golf ball is photographed to obtain another image thereof.

To compute the rotational amount and the like among not less than two images, the rotational amount and the like between successive images are computed respectively as described above to thereby find the rotational amount and the like of the sphere successively.

The flight characteristic, including the flight path of the golf ball, such as its driving angle and deviation angle can be computed by finding the moving speed of each of the three components of each image of the golf ball at the position of the center of gravity thereof in the above-described method. More specifically, supposing that the center of gravity of the golf ball at a given time is Gx(t), Gy(t), Gz(t), the moving speed Vx, Vy, and Vz of the three components of the golf ball and the speed V of the golf ball are found by an equation 16 shown below:

Equation 16 (16)

$$V_x = \frac{Gx(t + dt) - Gx(t)}{dt}, \quad V_y = \frac{Gy(t + dt) - Gy(t)}{dt}, \quad V_z = \frac{Gz(t + dt) - Gz(t)}{dt}$$
$$V = \sqrt{V_x^2 + V_y^2 + V_z^2}$$

The driving angle and the deviation angle are found by an equation 17 shown below. The progress direction of the golf ball, the right-to-left direction, and the height direction are set as an X-axis, a Y-axis, and a Z-axis respectively.

$$\text{Driving angle} = \tan^{-1}\left(\frac{V_z}{\sqrt{V_x^2 + V_y^2}}\right), \text{Deviation angle} = \tan^{-1}\left(\frac{V_y}{V_x}\right) \quad (17)$$

EXPERIMENT 1

The rotational characteristic of the sphere was measured.

The examples of the present invention and comparison examples are described in detail below.

As shown in FIG. 9, a golf ball having a plurality of marks given to positions on the surface thereof was installed on a rotary stage. The golf ball was photographed by a stroboscope to obtain a two-dimensional image thereof. The rotary stage was rotated at a certain angle to take two (or four) photographs of the golf ball. Comparison was made between a rotational amount of the golf ball found on the basis of the two (four) photographs and a rotational amount thereof read at the rotary stage to inspect measurement accuracy. The rotary stage was stationary, whereas the height and position of the camera were adjustable.

Photographing Condition of Ball

The image of the golf ball was obtained by photographing it with a camera 1 at X=0, Y=0, and Z (depth direction)=0 at coordinates of the surface of a camera film. The golf ball was photographed with a camera 2 to obtain images thereof in the following four conditions of A, B, C, and D. The unit of the movement distance of the ball-photographing position was millimeter.

Condition A: The golf ball was photographed in a favorable condition. That is, the golf ball was photographed in a large size, and the edge thereof was clearly seen (X=0, Y=0, and Z (depth direction)=0 at coordinates on surface of camera film).

Condition B: The golf ball was photographed in a large size, and one edge thereof was difficult to see (X=100, Y=100, and Z (depth direction)=0 at coordinates on surface of camera film).

Condition C: The golf ball was photographed in a favorable condition. That is, the golf ball was photographed in a small size, and the edge thereof was clearly seen (X=0, Y=0, and Z (depth direction)=−1 at coordinates on surface of camera film).

Condition D: The golf ball was taken in a small size, and one edge thereof was difficult to see (X=100, Y=100, and Z (depth direction)=−100 at coordinates on surface of camera film).

EXAMPLE 1

The spin amount was computed by a method similar to the measuring method of the embodiment of the present invention.

COMPARISON EXAMPLE 1

On the basis of a two-dimensional image of a golf ball, the three-dimensional vectors of points such as marks fixed to the golf ball were found by setting the radius of the ball image as the unit radius. The spin amount was found from the rotational angles of the vectors in a plurality of images. The posture displacement operation based on the genetic algorithm was not performed.

COMPARISON EXAMPLE 2

The comparison example 2 was similar to the example 1 except that the operation of deriving the relationship between the three-dimensional coordinates and the two-dimensional coordinates by using at least one photographing means was not performed. That is, the posture displacement operation was performed not by converting the position of the mark given to the surface of the imaginary sphere formed at coordinate in the three-dimensional space into the position on the two-dimensional image, but by projecting (visual point was fixed) the mark in a two-dimensional direction.

The backspin and sidespin components were measured in the example 1 and the comparison examples 1 and 2. Tables 1 and 2 show measured number of rotations and the measured number of rotations and the difference between the measured number of rotations and the theoretical value.

TABLE 1

| | front-to-back | | | backspin component (rpm) | | |
|---|---|---|---|---|---|---|
| X | Y | direction | photographed state | CE1 | CE2 | E1 |
| | | read value (theoretical value) | | 3120 | 3120 | 3120 |
| 0 | 0 | 0 | ball is photographed in a large size, and its edge is clearly seen | 3100 | 3112 | 3115 |
| 100 | 100 | 0 | ball is photographed in a large size, and its one edge is difficult to see | 3201 | 3111 | 3114 |
| 0 | 0 | −100 | ball is photographed in a small size, and its edge is clearly seen | 3221 | 3131 | 3127 |
| 100 | 100 | −100 | ball is photographed in a small size, and its one edge is difficult to see | 2871 | 3164 | 3130 |

| | front-to-back | | | difference between measured number of rotations and theoretical value (rpm) | | |
|---|---|---|---|---|---|---|
| X | Y | direction | photographed state | CE1 | CE2 | E1 |
| 0 | 0 | 0 | ball is photographed in a large size, and its edge is clearly seen | −20 | −8 | −5 |
| 100 | 100 | 0 | ball is photographed in a large size, and its one edge is difficult to see | 81 | −9 | −6 |
| 0 | 0 | −100 | ball is photographed in a small size, and its edge is clearly seen | 101 | 11 | 7 |
| 100 | 100 | −100 | ball is photographed in a small size, and its one edge is difficult to see | −249 | 44 | 10 | where E denotes example and where CE denotes comparison example.

TABLE 2

| | front-to-back | | | sidespin component (rpm) | | |
|---|---|---|---|---|---|---|
| X | Y | direction | photographed state | CE1 | CE2 | E1 |
| | read value (theoretical value) | | | 325 | 325 | 325 |
| 0 | 0 | 0 | ball is photographed in a large size, and its edge is clearly seen | 315 | 317 | 318 |
| 100 | 100 | 0 | ball is photographed in a large size, and its one edge is difficult to see | 106 | 340 | 336 |
| 0 | 0 | −100 | ball is photographed in a small size, and its edge is clearly seen | 102 | 315 | 318 |
| 100 | 100 | −100 | ball is photographed in a small size, and its one edge is difficult to see | 50 | 210 | 313 |

| | front-to-back | | | difference between measured number of rotations and theoretical value (rpm) | | |
|---|---|---|---|---|---|---|
| X | Y | direction | photographed state | CE1 | CE2 | E1 |
| 0 | 0 | 0 | ball is photographed in a large size, and its edge is clearly seen | −10 | −8 | −7 |
| 100 | 100 | 0 | ball is photographed in a large size, and its one edge is difficult to see | −219 | 15 | 11 |
| 0 | 0 | −100 | ball is photographed in a small size, and its edge is clearly seen | −223 | −10 | −7 |
| 100 | 100 | −100 | ball is photographed in a small size, and its one edge is difficult to see | −275 | −115 | −12 | where E denotes example and where CE denotes comparison example.

As shown in tables 1 and 2, it was confirmed that in the example 1, the spin amount could be found with high accuracy. That is, even though the photographing conditions were varied from the condition A to the condition D, the difference between the measured number of rotations and the read value was very small. It was also confirmed that in example 1, measurement accuracy was not low even though the edge of the ball was unclear, the ball image was formed at an end of the screen or in a small size.

That is, in the case where the ball was photographed in a large size, the measurement accuracy was favorable in each of the example 1 and the comparison examples 1 and 2. In the case where the ball was photographed in a small size, the measurement accuracy was unfavorable in the comparison example 1. In the case where the ball was photographed at the center of the screen, the measurement accuracy was favorable in each of the example 1 and the comparison examples 1 and 2. In the case where the ball was photographed at an end of the screen, the measurement accuracy was unfavorable in the comparison examples 1 and 2.

EXPERIMENT 2

The flight characteristic was measured.

EXAMPLE 2

The deviation angle of the ball, its driving angle, and its speed were computed by a method similar to the measuring method of the embodiment of the present invention.

A sensor was used to measure the deviation angle of the ball, its driving angle, and its speed correctly in a ball-hitting test. Table 3 shows results in the example 2 and results in the ball-hitting Test in which the sensor was used.

TABLE 3

| | measurement with sensor | | | example 2 | | |
|---|---|---|---|---|---|---|
| shot number | ball speed | deviation angle | driving angle | ball speed | deviation angle | driving angle |
| 1 | 59.3 | 1.26 | 9.7 | 59.2 | 1.31 | 9.72 |
| 2 | 58.2 | 2.57 | 9.23 | 58.1 | 2.41 | 9.29 |
| 3 | 59.7 | 2.8 | 13.53 | 59.8 | 2.77 | 13.51 |
| 4 | 60.0 | −2.3 | 11.25 | 59.9 | −2.4 | 11.21 |
| 5 | 56.2 | 5.11 | 16.5 | 56.3 | 5.13 | 16.31 |
| 6 | 59.4 | 1.82 | 12.65 | 59.6 | 1.82 | 12.61 |
| 7 | 56.9 | 2.72 | 14.4 | 56.8 | 2.71 | 14.49 |
| 8 | 60.6 | −2.26 | 10.47 | 60.3 | −2.23 | 10.41 |
| 9 | 59.6 | 0.37 | 13.15 | 59.6 | 0.34 | 13.01 |
| 10 | 59.9 | −3.99 | 10.53 | 59.7 | −3.92 | 10.44 |

The result of the example 2 and the result of the measurement made by using the sensor were almost the same. Thus it was confirmed that the measuring method of the present invention is capable of measuring the deviation angle of the ball, its driving angle, and its speed as accurately as the method carried out by using the sensor. It was also confirmed that the measuring method of the present invention improves over the conventional measuring method in accuracy in measuring the deviation angle.

As apparent from the foregoing description, according to the present invention, the three-dimensional posture and position of the sphere are specified by the above-described method. Therefore based on the relationship between the three-dimensional Posture and position thereof at one time and the three-dimensional posture and position thereof at another time, it is possible to measure the rotational characteristic thereof such as the number of rotations thereof and the direction of its rotational axis and the flight characteristic such as the flight path thereof and its flight speed with ease and high accuracy. Therefore the measuring method of the present invention is optimum for measuring the spin amount of the golf ball rotating without being subjected to an external force, the driving angle and deviation angle of a hit ball. Particularly, the measuring method of the present invention improves in accuracy in measuring the deviation angle in a right-to-left direction at the time of hitting the golf ball.

On the basis of the image of the sphere obtained by photographing the sphere, computations are performed according to the programs in the computer. Thereby it is possible to measure the rotational and flight characteristics of the sphere automatically. Therefore it is possible to reduce time and labor required in measuring them.

Further according to the measuring method of the present invention, the data of the contour of the sphere is not used. Thus in measurement accuracy, the measuring method of the present invention improves greatly over the conventional measuring method. Therefore it is possible to prevent measurement results from being affected adversely by a photographing situation. Further it is unnecessary to take much time and labor in minutely adjusting ways of directing flashlight to the sphere photographing it. That is, the measuring method is capable of measuring the rotational and flight characteristics of the sphere with high accuracy. Thus it is possible to reduce the cost for the measurement.

Further according to the measuring method, it is possible to specify the three-dimensional posture and position of the sphere from one two-dimensional image thereof. Thus it is possible to reduce time and labor in specifying the three-dimensional posture and position of the sphere. It is possible to find the rotational and flight characteristics of the sphere moving at a high speed by utilizing a camera having a high-speed shutter or a micro-flash.

What is claimed is:

1. A method of measuring rotational and flight characteristics of a sphere, comprising the steps of:

photographing said sphere, at predetermined intervals, having a plurality of marks given to a surface thereof while said sphere is rotating to obtain a plurality of two-dimensional images of said sphere; generating an imaginary sphere, having a plurality of marks given to a surface thereof, formed at coordinates of a three-dimensional space of a computer screen; and setting an arbitrary posture of said imaginary sphere and an arbitrary position thereof as a reference posture and a reference position respectively;

deriving a relationship between three-dimensional coordinates and two-dimensional coordinates by using at least one photographing means;

converting positions of said marks given to said surface of said imaginary sphere formed at said coordinates in said three-dimensional space into positions on a two-dimensional image by using said relationship to find coordinate values of two-dimensional imaginary marks and find coordinate values of said marks present on said two-dimensional images of said sphere;

performing an operation of displacing a posture of said imaginary sphere relative to said reference posture and said reference position in such a way that said coordinate values of said two-dimensional imaginary marks and said coordinate values of said marks present on said two-dimensional images of said sphere are coincident with each other to specify a three-dimensional posture of said sphere and a three-dimensional position thereof for each of said two-dimensional images of said sphere, according to an amount of said posture displacement operation; and computing said rotational and flight characteristics of said sphere, according to said three-dimensional posture and position of said sphere specified for each of said two-dimensional images of said sphere at one time and said three-dimensional posture and position thereof at another time, wherein said posture displacement operation comprises an operation of moving and rotating said imaginary sphere; and an amount of said posture displacement operation relative to said reference posture and said reference position is found by computations based on an optimization method called a genetic algorithm.

2. The method according to claim 1, wherein at least six three-dimensional coordinates are used in deriving said relationship between said three-dimensional coordinates and said two-dimensional coordinate.

3. The method according to claim 1, wherein as design six variables to be used in said posture displacement operation, three-dimensional positions of a center of gravity of said imaginary sphere and rotation angles thereof on rectangular coordinates consisting of an abscissa axis, an ordinate axis, and a vertical axis in a imaginary three-dimensional space.

4. The method according to claim 1, wherein a plurality of said marks are given to a surface of said imaginary sphere, with said marks symmetrical at not more than four times with respect to a rotational axis of said sphere in an operation of rotating said imaginary sphere.

5. An apparatus of measuring rotational and flight characteristics of a sphere, comprising:

a photographing means capable of photographing said sphere in various directions;

a recording means for recording two-dimensional images of said sphere obtained by said photographing means; and a computing means for generating an imaginary sphere, similar to said sphere, at coordinates in a three-dimensional space and specifying a three-dimensional posture of said sphere and a three-dimensional position thereof, based on said imaginary sphere and said two-dimensional images of said sphere to find said rotational and flight characteristics of said sphere, said computing means comprising a coordinate conversion program capable of deriving a relationship between three-dimensional coordinates and two-dimensional coordinates by using at least one photographing means; and a posture recognition program for displacing a posture of said imaginary sphere in such a way that coordinate values of said marks present on said two-dimensional images of said sphere are coincident with coordinate values of two-dimensional imaginary marks found by converting positions of said marks given to a surface of said imaginary sphere formed at said coordinates in said three-dimensional space and specifying said three-dimensional posture of said sphere and a three-dimensional position thereof, according to an amount of said posture displacement operation relative to a reference posture of said imaginary sphere and a reference position thereof, wherein said computing means has an optimization program for computing an amount of an operation of displacing said imaginary sphere relative to said reference posture and said reference position thereof, based on a genetic algorithm.

6. The apparatus according to claim 5, wherein said photographing means has a construction capable of photographing a sphere rotating or moving at a plurality of times at predetermined intervals.

7. A method of measuring rotational and flight characteristics of a sphere, comprising the steps of:

photographing said sphere, at predetermined intervals, having a plurality of marks given to a surface thereof while said sphere is rotating to obtain a plurality of two-dimensional images of said sphere; generating an imaginary sphere, having a plurality of marks given to a surface thereof, formed at coordinates of a three-dimensional space of a computer screen; and setting an arbitrary posture of said imaginary sphere and an arbitrary position thereof as a reference posture and a reference position respectively;

deriving a relationship between three-dimensional coordinates and two-dimensional coordinates by using at least one photographing means;

converting positions of said marks given to said surface of said imaginary sphere formed at said coordinates in said three-dimensional space into positions on a two-dimensional image by using said relationship to find coordinate values of two-dimensional imaginary marks and find coordinate values of said marks present on said two-dimensional images of said sphere;

performing an operation of displacing a posture of said imaginary sphere relative to said reference posture and said reference position in such a way that said coordinate values of said two-dimensional imaginary marks and said coordinate values of said marks present on said two-dimensional images of said sphere are coincident with each other to specify a three-dimensional posture of said sphere and a three-dimensional position thereof for each of said two-dimensional images of said sphere, according to an amount of said posture displacement operation; and computing said rotational and flight characteristics of said sphere, according to said three-dimensional posture and position of said sphere specified for each of said two-dimensional images of said sphere at one time and said three-dimensional posture and position thereof at another time, wherein a plurality of said marks are given to a surface of said imaginary sphere, with said marks symmetrical at not more than four times with respect to a rotational axis of said sphere in an operation of rotating said imaginary sphere.

* * * * *